(12) United States Patent
Dai et al.

(10) Patent No.: US 11,750,454 B2
(45) Date of Patent: Sep. 5, 2023

(54) RIS ACQUISITION PROCEDURE BASED ON SIDELINK DISCOVERY

(71) Applicant: QUALCOMM Incorporated, San Diego, CA (US)

(72) Inventors: Yucheng Dai, San Diego, CA (US); Wooseok Nam, San Diego, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 17/183,086

(22) Filed: Feb. 23, 2021

(65) Prior Publication Data

US 2022/0271995 A1    Aug. 25, 2022

(51) Int. Cl.
| H04L 41/0813 | (2022.01) |
| H04W 48/16 | (2009.01) |
| H04W 52/02 | (2009.01) |

(52) U.S. Cl.
CPC ......... *H04L 41/0813* (2013.01); *H04W 48/16* (2013.01); *H04W 52/0206* (2013.01)

(58) Field of Classification Search
CPC .... H04L 41/0813; H04W 48/16; H04W 52/02
See application file for complete search history.

(56) References Cited

U.S. PATENT DOCUMENTS

| 2018/0317278 A1* | 11/2018 | Fujishiro | .......... H04W 36/0088 |
| 2019/0141694 A1* | 5/2019 | Gupta | ................ H04W 72/542 |
| 2022/0014935 A1* | 1/2022 | Haija | .................... H04L 5/0048 |

FOREIGN PATENT DOCUMENTS

| CN | 111093267 A | 5/2020 | |
| WO | WO 2022/133958 A1 * | 6/2022 | ........... H04B 7/0408 |

OTHER PUBLICATIONS

Elbir A., et al., "Federated Learning for Channel Estimation in Conventional and IRS-Assisted Massive MIMO", arxiv.org, Cornell University Library, 201 Olin Library Cornell University Ithaca, NY 14853, Aug. 25, 2020, pp. 1-13, XP081747858, par. III D, p. 7, left-hand column, lines 22-27.
Guo H., et al., "Weighted Sum-Rate Maximization for Reconfigurable Intelligent Surface Aided Wireless Networks", arxiv.org, Cornell University Library, 201 Olin Library Cornell University Ithaca, NY 14853, Dec. 27, 2019, pp. 1-13 XP081566542, par. II B.
International Search Report and Written Opinion—PCT/US2022/016357—ISA/EPO—dated Sep. 19, 2022 (24 pages).

(Continued)

*Primary Examiner* — Kyaw Z Soe
(74) *Attorney, Agent, or Firm* — Procopio, Cory, Hargreaves & Savitch LLP

(57) ABSTRACT

An apparatus receives reconfigurable intelligent surface (RIS) information in a sidelink message from a controller of an RIS and transmits the RIS information to a base station. A base station receives RIS information for an RIS and transmits, to the RIS, a message indicating for the RIS to stop transmitting the RIS information. An RIS transmits, via a controller at the RIS, a sidelink message comprising RIS information for the RIS and receives, from a base station, an indication to stop transmitting the RIS information.

30 Claims, 17 Drawing Sheets

(56) References Cited

OTHER PUBLICATIONS

Partial International Search Report—PCT/US2022/016357—ISA/EPO—dated Jun. 2, 2022 (12 pages).

Wymeersch H., et al., "Radio Localization and Mapping with Reconfigurable Intelligent Surfaces", arxiv.org, Cornell University Library, 201 Olin Library Cornell University, Ithaca, NY, 14853, Dec. 19, 2019, XP081569725, pp. 1-7, p. 4, cols. 2, 4, Figure 1, p. 2, col. 2, Abstract, Title, Right-Hand Column, Lines 29-31, Figure 3, pp. 5,6.

Yuan X., et al., "Reconfigurable-Intelligent-Surface Empowered 6G Wireless Communications: Challenges and Opportunities", arxiv.org, Cornell University Library, 201 Olin Library Cornell University Ithaca, NY 14853, Aug. 13, 2020, pp. 1-7, XP081738590, par. II B, p. 3, left-hand column, lines 2-20 figure 1.

Zhang, H., et al., "Towards Ubiquitous Positioning by Leveraging Reconfigurable Intelligent Surface", Arxiv.Org, Cornell University Library, 201 Olin Library Cornell University Ithaca, NY 14853, Jul. 10, 2020 (Jul. 10, 2020), XP081719143, pp. 1-5, Section II, Par. A, p. 1, Right-Hand Column, Section II, Par C, p. 2, Left-Hand Column, Section III, Item 4), at p. 3, Left-Hand Column, Figures 1, 2.

\* cited by examiner

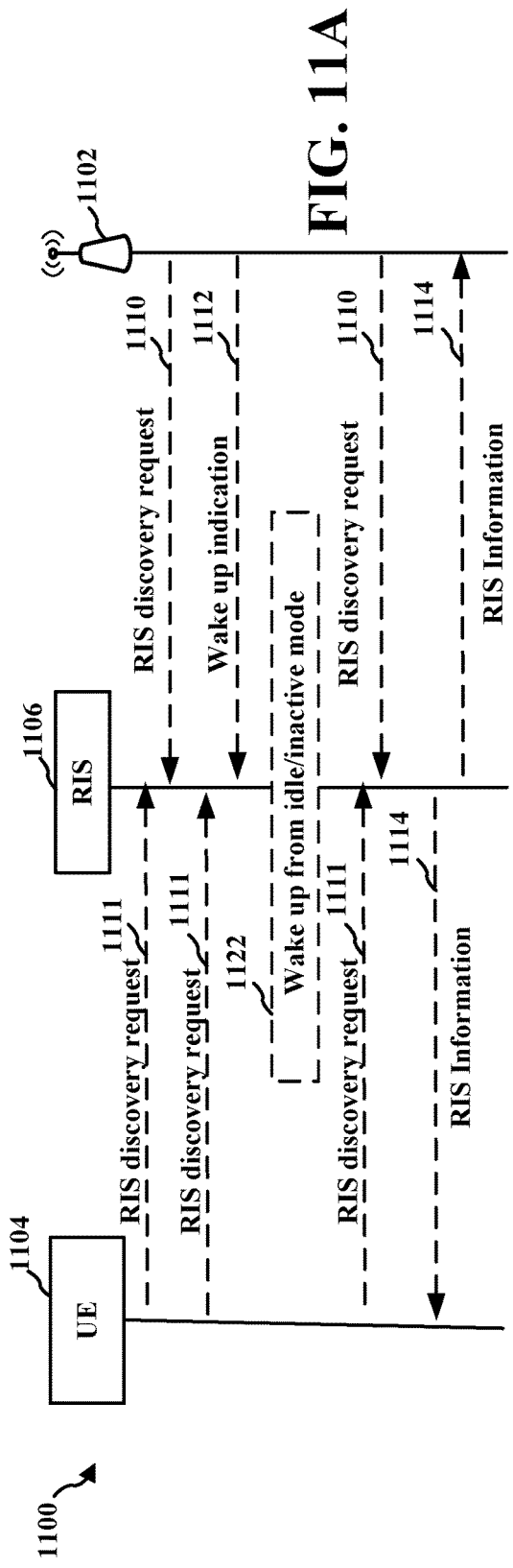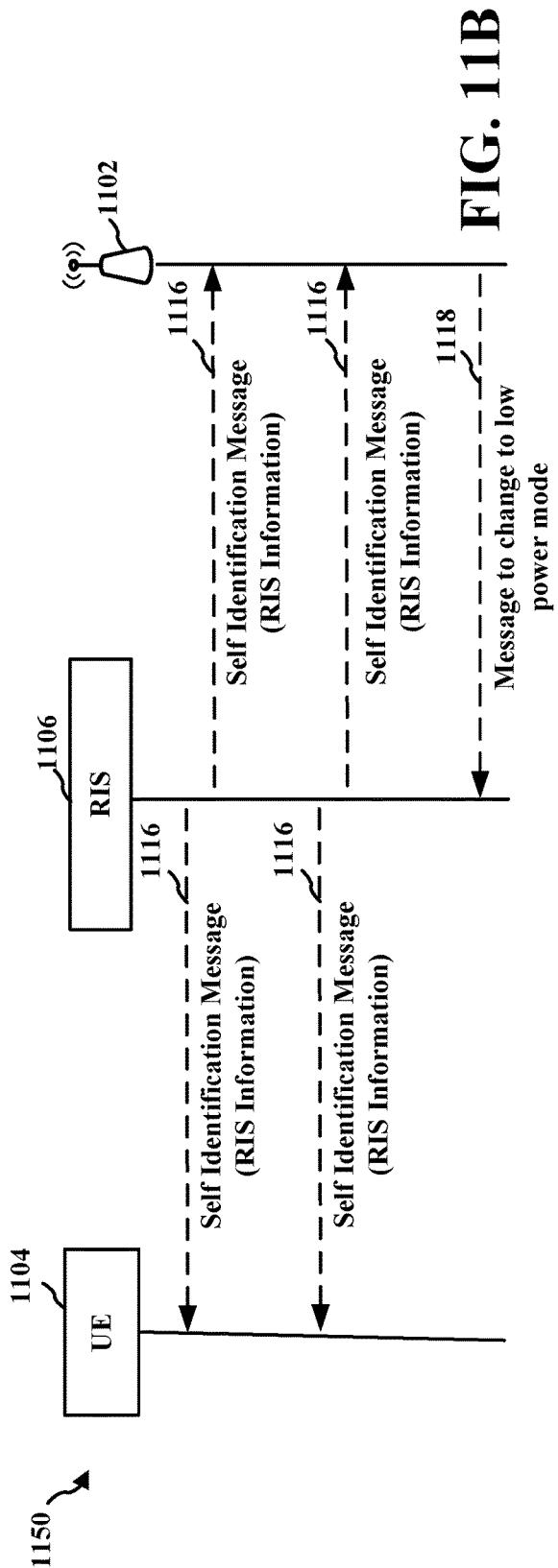

RIS ACQUISITION PROCEDURE BASED ON SIDELINK DISCOVERY

BACKGROUND

Technical Field

The present disclosure relates generally to communication systems, and more particularly, to wireless communication including a reconfigurable intelligent surface (RIS).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise communication that is reflected by an RIS. Improvements provided herein improve communication involving an RIS and may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus receives reconfigurable intelligent surface (RIS) information in a sidelink message from a controller of an RIS and transmits the RIS information to a base station.

In another aspect of the disclosure, a method, a computer-readable medium, and an apparatus are provided for wireless communication at a base station. The apparatus receives RIS information for an RIS and transmits, to the RIS, a message indicating for the RIS to stop transmitting the RIS information.

In an aspect of the disclosure, a method, a computer-readable medium, and an apparatus are provided for wireless communication at an RIS. The apparatus transmits, via a controller at the RIS, a sidelink message comprising RIS information for the RIS and receives, from a base station, an indication to stop transmitting the RIS information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 11A and 11B illustrate example communication flows about RIS discovery transmissions.

DETAILED DESCRIPTION

Figure 1:
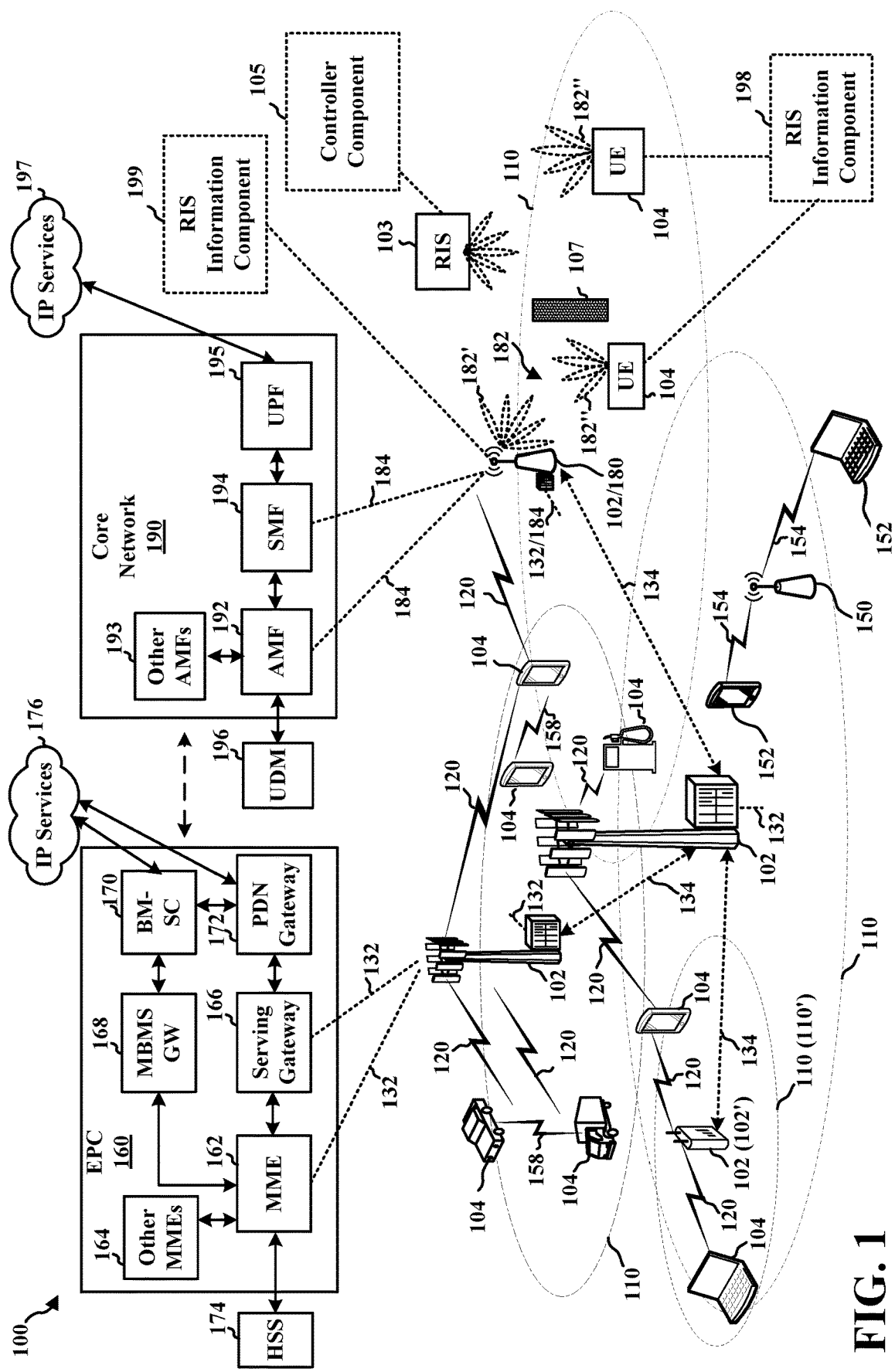
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A reconfiguration intelligent surface (RIS) may be employed to extend coverage, e.g., beamformed coverage, with lower power consumption. The RIS may be composed of a larger number of uniformly distributed electrically controllable elements. Each RIS element may have a reconfigurable electromagnetic characteristic, e.g., a reflection coefficient. Depending on the combination of configured states of the elements, the RIS may reflect and modify the incident radio waveform in a controlled manner, such as changing a reflected direction, changing a beam width, etc. The RIS may function as a near passive device, and the reflection direction may be controlled by a control node, such as a base station or a UE. For example, the RIS may reflect an impinging wave to a UE in a direction indicated by the base station.

In order to perform RIS assisted communication/sensing/positioning functions, the base station or UE may use the position of the RIS. RIS information may be known by a network if the placement of the RIS was planned by the network, and the base station may transmit information about the RIS to other nodes (e.g., UEs in the cell), e.g., in system information. UEs in the coverage of the cell may receive the system information in order to discover the presence of an RIS, the RIS position, the RIS capabilities, or other RIS information about a particular RIS.

However, an RIS may be autonomously deployed by an operator or by a third party user. The position, RIS capabilities, and other RIS information may not be initially known to a device that may operate as a control node for the RIS (e.g., a base station or UE). In other aspects, the RIS may be a mobile RIS. As one example, the RIS may be mounted to or comprised in a vehicle. The location of a mobile RIS may change over time, and a nearby device that is capable of operating as a control node may not be aware of the RIS and may not know the position, RIS capability, or other RIS information about the RIS. Even if the control node is aware of the presence and RIS capability of the RIS, as the RIS moves, the control node may not be aware of the changed position of the RIS.

Aspects presented herein enable a control node, such as a base station, to detect and RIS, acquire RIS information, and/or position information about an autonomously deployed RIS or a mobile RIS. Once the control node acquires the RIS information, the control node may transmit (e.g., broadcast) the RIS information such as via system information to assist other wireless devices (e.g., such as UEs) in discovering the RIS.

FIG. 1 is a diagram illustrating an example of a wireless communications system and an access network 100. The wireless communications system (also referred to as a wireless wide area network (WWAN)) includes base stations 102, UEs 104, an RIS 103, an Evolved Packet Core (EPC) 160, and another core network 190 (e.g., a 5G Core (5GC)). In some aspects, the RIS 103 may reflect beamformed communication between a base station and a UE to avoid a blockage 107 that blocks a directional beam between the base station 102 or 180 and the UE 104. Referring again to FIG. 1, in certain aspects, a UE 104 may include an RIS information component 198 configured to receive RIS information in a sidelink message from a controller of an RIS 103 and transmit the RIS information to a base station 102 or 180. A base station 102 or 180 may include an RIS information component 199 that is configured to receive RIS information for an RIS 103 (e.g., from the RIS 103 directly or from a UE 104) and to transmit, to the RIS 103, a message indicating for the RIS 103 to stop transmitting the RIS information. The RIS 103 may include a controller component 105 configured to transmit a sidelink message comprising RIS information for the RIS 103 and to receive, from a base station 102 or 180, an indication to stop transmitting the RIS information.

The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU), etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30

GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
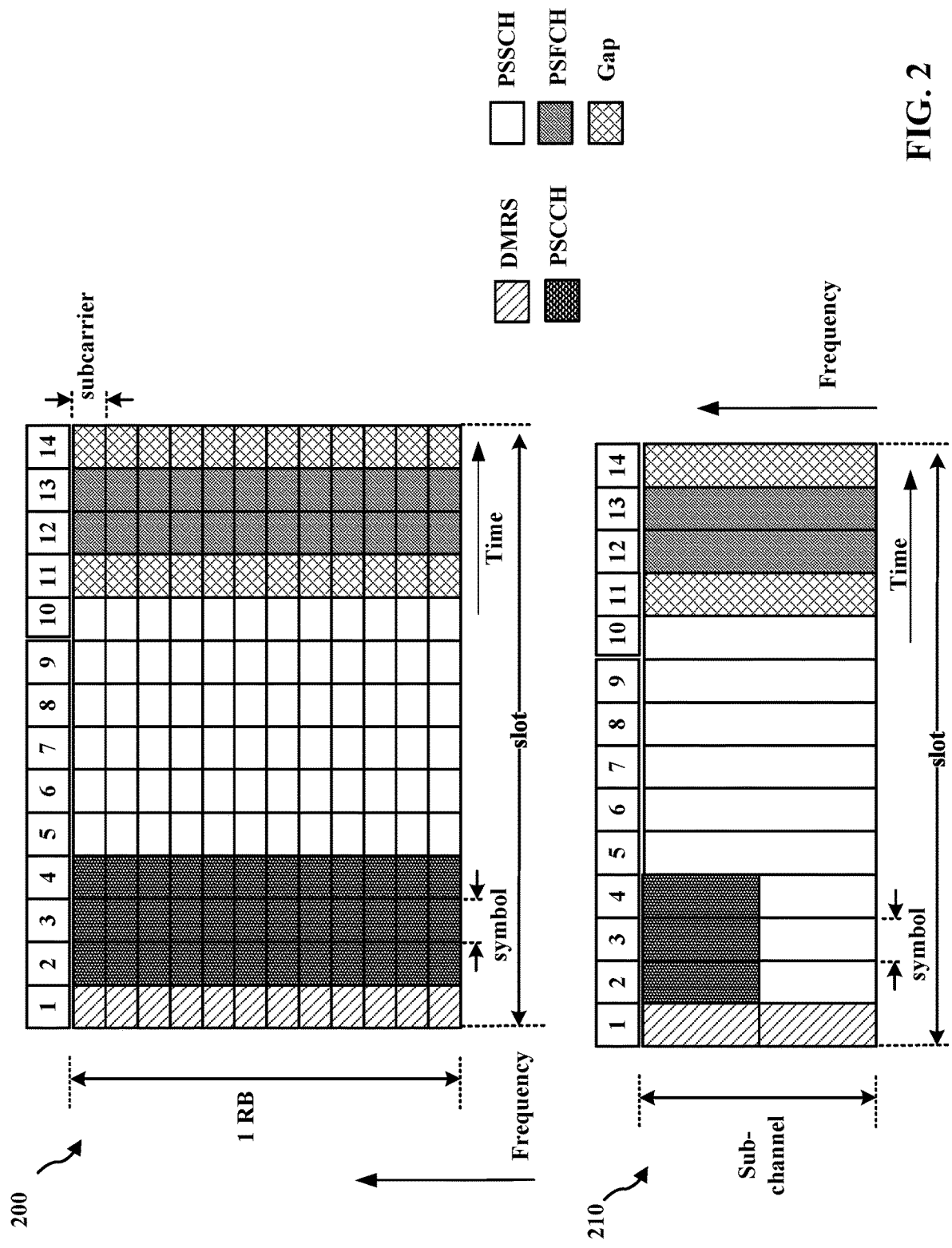
FIG. 2 illustrates example aspects of a sidelink slot structure.

FIG. 2 includes diagrams 200 and 210 illustrating example aspects of slot structures that may be used for sidelink communication (e.g., between UEs 104, RSU, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
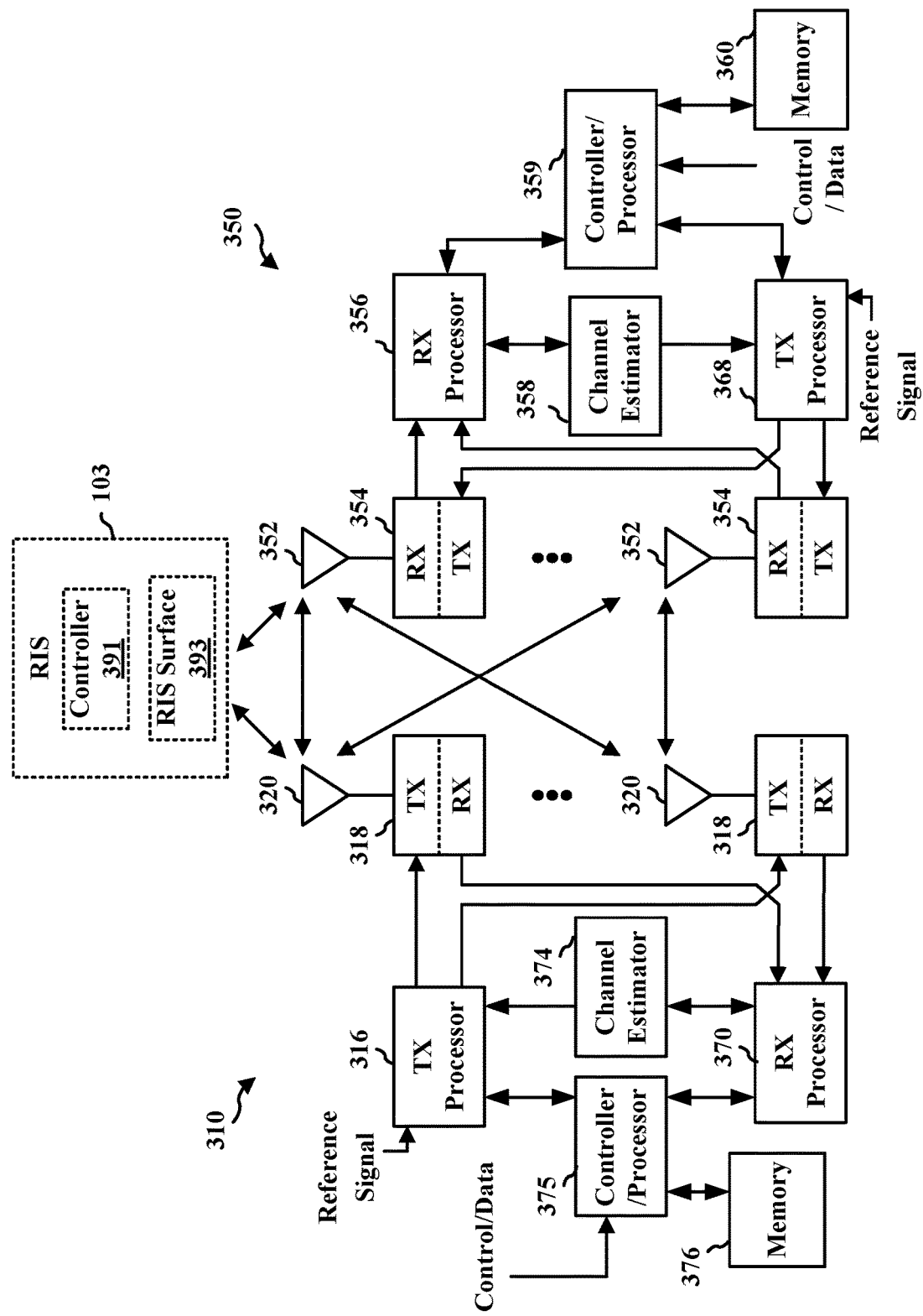
FIG. 3 is a diagram illustrating an example of a first device and a second device involved in wireless communication based, e.g., on sidelink.

FIG. 3 is a block diagram of a first wireless communication device 310 in communication with a second wireless communication device 350 based on sidelink. In some examples, the devices 310 and 350 may communicate based on sidelink using a PC5 interface. The devices 310 and the 350 may comprise a UE, an RIS, a base station, etc. In some aspects, the device 310 may correspond to a base station 102 or 180, and the device 350 may correspond to a UE 104. In such aspects, communication may be provided between the base station and the UE by an RIS 103, such as described in connection with any of FIG. 1 or FIGS. 4-17. The communication may be intelligently reflected, e.g., by an RIS surface 393 of the RIS 103. Discovery information, such as RIS capability information and/or position information for the RIS 103 may be transmitted by the controller 391, e.g., via sidelink.

Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the RIS information component 198 or 199, or the controller component 105 of FIG. 1.

At least one of the TX processor 316, the RX processor 370, and the controller/processor 375 may be configured to perform aspects in connection with the RIS information component 198 or 199, or the controller component 105 of FIG. 1.

Massive MIMO may help to increase throughput in a wireless communication system. Beamforming gain may be achieved through the use of active antenna units. Individual RF chains may be used per antenna port. The use of active antenna units (AAU) may increase power consumption. A reconfiguration intelligent surface (RIS) may be employed to extend coverage, e.g., beamformed coverage, with reduced power consumption. The RIS may include a larger number of uniformly distributed electrically controllable elements. Each RIS element may have a reconfigurable electromagnetic characteristic, e.g., a reflection coefficient. Depending on the combination of configured states of the elements, the RIS may reflect and modify the incident radio waveform in a controlled manner, such as changing a reflected direction, changing a beam width, etc. The RIS may function as a near passive device, and the reflection direction may be controlled by the base station. The RIS may reflect an impinging wave in a direction indicated by the base station to a UE.

An RIS may be deployed in wireless communication systems, including cellular systems, such as LTE, NR, etc. An RIS may alter the channel realization in a controlled manner, which may improve channel diversity. The increased diversity may provide robustness to channel blocking/fading, which may be of particular importance for mmWave communication. Compared to a wireless relay or repeater systems, an RIS may be more cost and energy efficient.

Figure 4A:
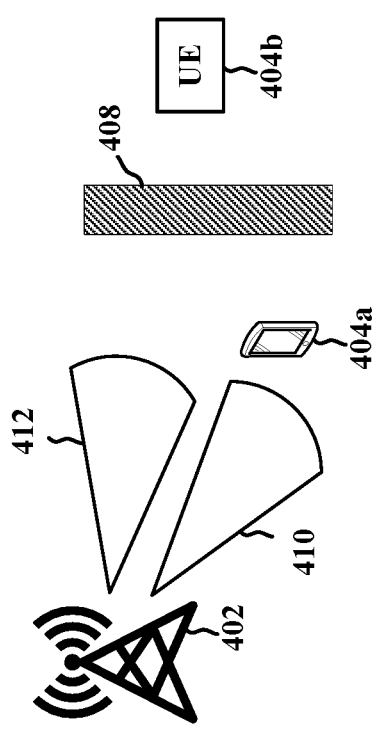
FIG. 4A illustrates a blockage to wireless communication between a base station and a UE.
Figure 4B:
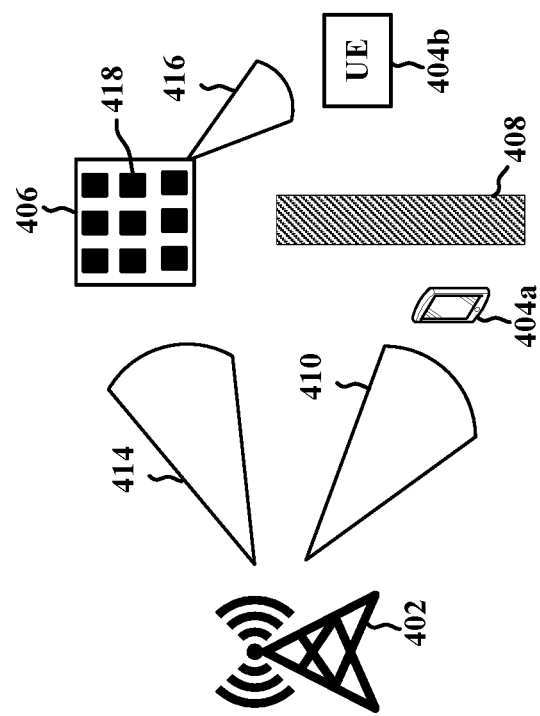
FIG. 4B illustrates an RIS that intelligently reflects communication between a base station and a UE.

A base station may control the RIS to extend beam coverage and/or to address blockages between the base station and the UE. FIG. 4A illustrates an example in which a base station 402 transmits beamformed communication to UEs using directional beams 410, 412. A first UE 404a may be able to receive the direct transmission using the beam 410. However, FIG. 4A illustrates a blockage 408 that blocks the beam 412 from reception at the second UE 404b. As illustrated in FIG. 4B, the base station 402 may transmit communication for the second UE 404b using a directional beam 414 (which may be referred to as the impinging beam) to the RIS 406 for reflection over a directional beam 416 to the UE 404b. The base station 402 may indicate the beam direction 416 to the RIS, and the RIS may reflect the impinging wave on beam 414 in the direction of the beam 416.

Figure 5:
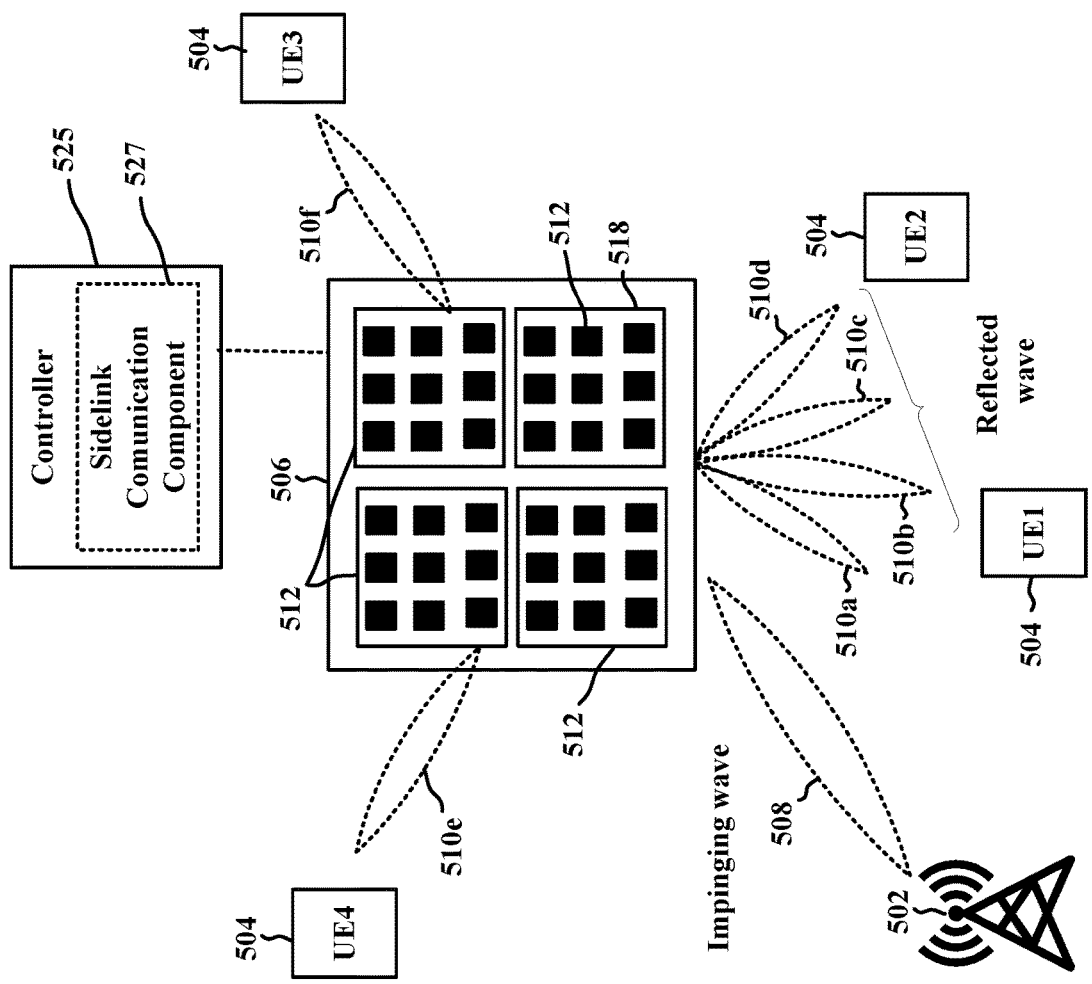
FIG. 5 illustrates an RIS that intelligently reflects communication between a base station and a UE.

The RIS may include multiple RIS elements 418 that are configuration to adjust the reflected direction, the beam width, etc. FIG. 5 illustrates an example in which the RIS 506 includes multiple subsets 512 of multiple RIS elements 518. As illustrated, different subsets 512 of RIS elements 518 may serve different UEs 504. The RIS elements 518 may be controlled by a controller 525 at the RIS 506 based on control information received by the base station 502. As described in connection with FIG. 4B, the base station 502 may indicate a beam direction (e.g., any of 510a, 510b, 510c, 510d, 510e, or 510f) to the RIS for reflecting beamformed communication received as the impinging wave 508 to a particular UE 104 in a particular direction. The RIS may similarly be controlled by a UE for reflecting communication from the UE to a base station and/or to another UE.

The RIS may be controlled by a base station 502 or a UE 504, which may be referred to as the control node for the RIS. The UE and/or the base station use the RIS for communication, sensing, and/or positioning functions. In order to perform communication/sensing/positioning using an RIS 506, the UE may use the position of the RIS to determine position or location of the UE. RIS information may be known by a network based on network planning, and the base station may provide the RIS position and other RIS information to other nodes (e.g., UEs in the cell). For example, the base station may transmit the RIS information in system information. The UEs in the coverage of the cell may receive the system information in order to discover the presence of an RIS, the RIS position, the RIS capabilities, or other RIS information about a particular RIS.

However, an RIS may be autonomously deployed by an operator or by a third party user, e.g., and may not be a part of a planned network. The position, RIS capabilities, and other RIS information may not be initially known to a device that is capable of operating as a control node for the RIS (e.g., a base station 502 or UE 504) or otherwise using the RIS. In other aspects, the RIS may be mobile RIS. As one example, the RIS may be mounted to or comprised in a vehicle. The location of a mobile RIS may change over time, and a nearby device that is capable of operating as a control node may not be aware of the RIS and may not know the position, RIS capability, or other RIS information about the RIS. Even if a node is aware of the presence and RIS capability of the RIS, as the RIS moves, the node may not be aware of the changed position of the RIS.

Aspects presented herein enable a control node, such as a base station 502, to detect and RIS, acquire RIS information, and/or position information about an autonomously deployed RIS or a mobile RIS. Once the control node acquires the RIS information, the control node may transmit (e.g., broadcast) the RIS information such as via system information to assist other wireless devices (e.g., such as UEs 504) in discovering the RIS. Aspects of the present application enable the base station 502, or other control node, to acquire information about the RIS 506 even if the base station 502 does not have prior knowledge of the RIS 506. As presented herein, the controller 525 of the RIS 506 may further include a sidelink communication component 527 through which the RIS provides RIS information to a device within sidelink coverage of the RIS.

Figure 6B:
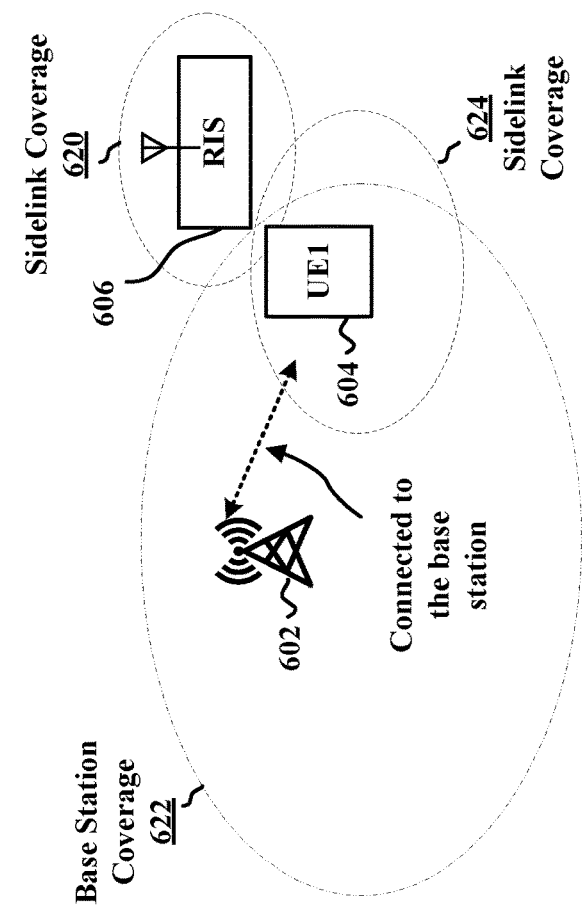
FIGS. 6A and 6B illustrate examples of acquisition of RIS information.
Figure 6A:
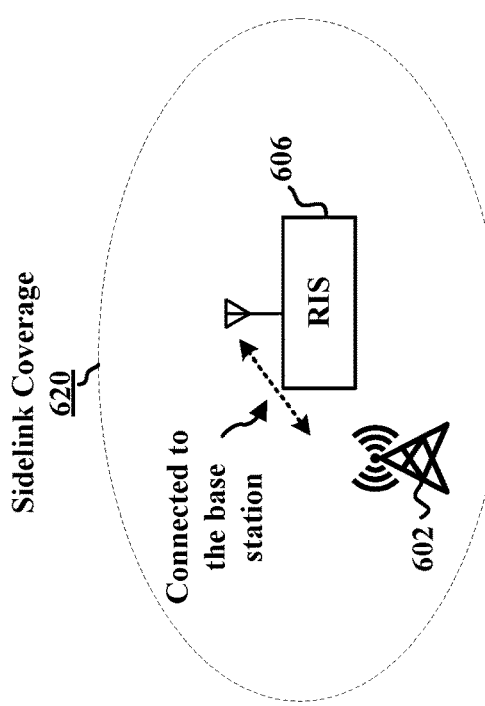

FIG. 6A illustrates an example scenario in which the base station 602 may be within the sidelink coverage 620 of the RIS 606. In this example, the RIS may be connected to the base station, e.g., for sidelink communication and may directly transmit information about the RIS 606 to the base station. The RIS information may include the RIS capabilities of the RIS 606 and/or a position of the RIS 606, such as described in connection with any of FIGS. 7-11B and 16.

FIG. 6B illustrates an example scenario in which the base station 602 is not in the sidelink coverage 620 of the RIS 606, although the RIS is within the base station's coverage 622. In this example, the RIS 606 may transmit the RIS information to a UE 604 that is within the RIS's sidelink coverage 620. The RIS 606 may be within the UE's sidelink coverage 624. The UE may be within the base station's coverage 622 and may transmit the RIS information received from the RIS 606 to the base station 602.

The RIS 606 may transmit its own RIS information to nearby devices, e.g., devices within the sidelink coverage 620 of the RIS 606. The RIS information may include RIS capability information and/or position information for the RIS 606. The RIS 606 may transmit the RIS information as a unicast, e.g., directly to the base station 602 or to a particular UE 604. In other aspects, the RIS 606 may broadcast the RIS information for reception by any device within the sidelink coverage 620. The RIS may transmit the RIS information on a PSCCH, a PSSCH, and/or a physical sidelink discovery channel (PSDCH). If the base station 602 is within the sidelink coverage 620 area of the RIS 606, the base station may receive the sidelink channel and acquire the RIS information, as illustrated in FIG. 6A, and as described in connection with FIGS. 7 and/or 9. If the base station is outside the sidelink coverage 620 of the RIS 606, a UE 604 within the sidelink coverage 620 may receive the RIS information, identify that the RIS 606 is a new RIS not known by the base station 602, and deliver the new RIS information to base station, as illustrated in FIG. 6B, and as described in connection with FIGS. 8 and/or 10. The UE may provide the RIS information to the base station via any of UCI, a MAC-CE, and/or an RRC message.

Once the base station 602 acquires the RIS information, the base station may send a message to RIS 606 indicating for the RIS to stop transmitting its position and/or other RIS information. The RIS 606 may include a control having a sidelink communication component that has sidelink communication (e.g., sidelink reception) capability or that supports another communication protocol used for control, such as described in connection with FIG. 5.

In some aspects, the RIS may know its own position information and may have sidelink transmission capability (e.g., such as via the sidelink communication component 527 comprised in the controller 525 of the RIS). The controller 525 may also be configured to control the RIS surface of the RIS based on control information from a control node. In some aspects, the position information may correspond to a geographical location of the RIS.

Figure 7:
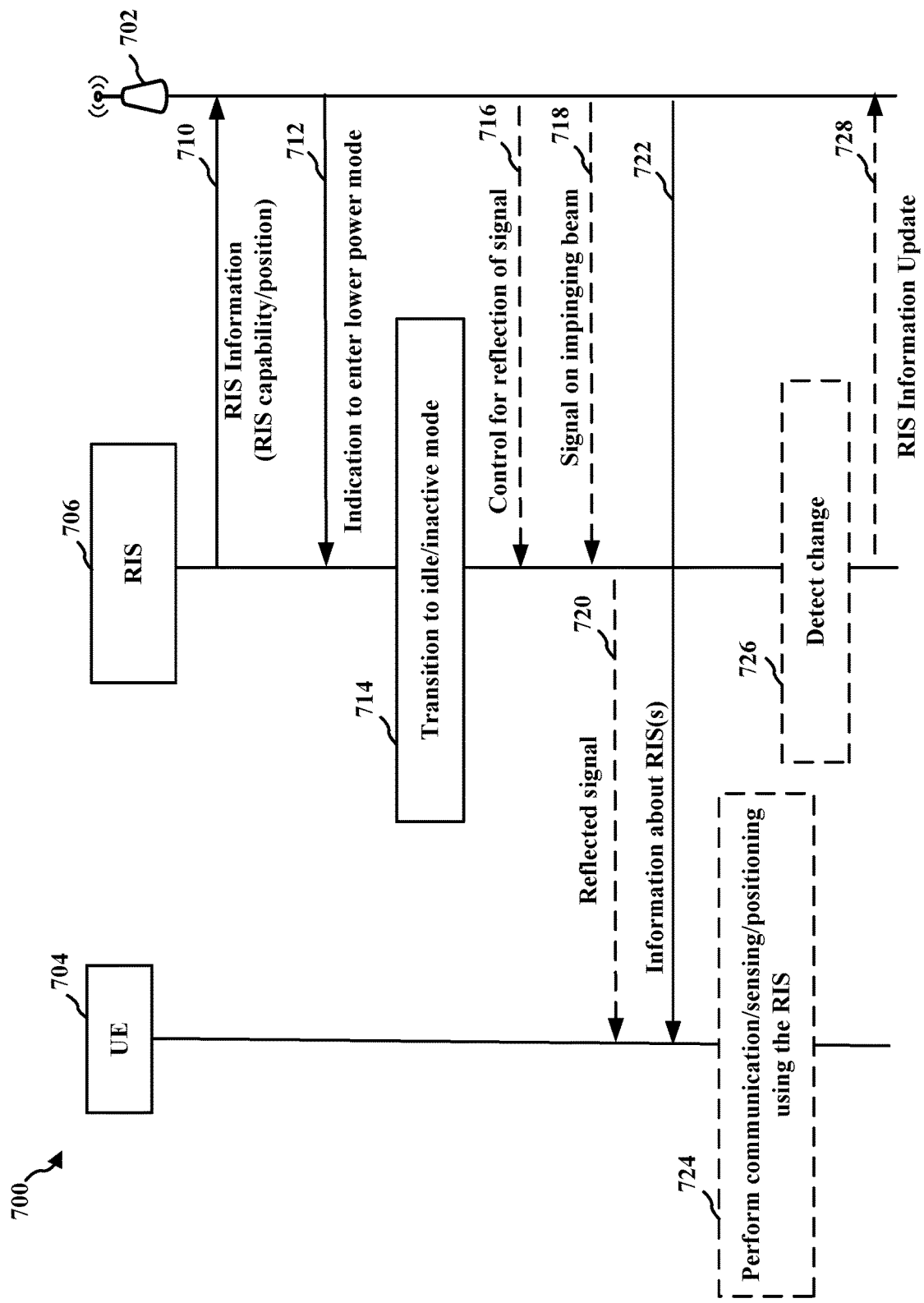
FIG. 7 illustrates an example communication flow including a base station directly acquiring RIS information about an RIS over sidelink.

FIG. 7 illustrates an example communication flow 700 between a base station 702 and an RIS 706 that enables acquisition of RIS information by the base station 702. The base station may correspond to the base station 602 in FIG. 6A, which is within the sidelink coverage 620 of the RIS 606. The base station 702 may similarly correspond to the base station 402 or 502 in FIG. 4B or FIG. 5. The RIS 706 transmits RIS information 710 including at least position information for the RIS 706. The RIS information 710 may further include information about RIS capabilities of the RIS 706. The RIS 706 may transmit the RIS information 710 as a sidelink unicast, e.g., directly to the base station 702. In other aspects, the RIS 706 may broadcast the RIS information. The RIS 706 may transmit the RIS information on a PSCCH, a PSSCH, and/or a physical sidelink discovery channel (PSDCH).

After acquiring the RIS information 710, the base station 702 may transmit and indication 712 for the RIS 706 to enter an idle/inactive mode. For example, the base station may respond with an indication that the base station 702 received the RIS information 710. In response, the RIS 706 may transition to a reduced power mode, such as an idle/inactive mode, at 714. As another example, the base station may transmit an indication for the RIS 706 to stop transmitting the RIS information 710, and in response, the RIS 706 may transition to a reduced power mode, such as an idle/inactive mode, at 714. The base station 702 may provide another type of indication, which the RIS may interpret to mean than the RIS 706 may transition to a reduced power state. In another example, the base station 702 may transmit an explicit indication to transition to an idle or an inactive mode, and in response, the RIS 706 may transition to a reduced power mode, such as an idle/inactive mode, at 714.

For a power-limited RIS, switching the sidelink communication component (e.g., transmitter) to an idle/inactive state may save energy after the RIS receives confirmation from the control node that the RIS's position has been recorded. The RIS may employ a wake up protocol so that the control node (e.g., the base station 702 or the UE 704) may wake up the RIS to obtain its position and/or control the RIS for communication. Additionally or alternatively, if the RIS 706 has a time-varying position and can measure the movement and/or position, the RIS 706 may use a periodic/aperiodic position update protocol via sidelink to keep the position information of the RIS 706 updated at the control node (e.g., base station 702), such as described in connection with FIG. 16. For example, the RIS may periodically transmit the RIS information update 728, or may transmit the RIS information update 728 in response to detecting a change in position and/or RIS capability, at 726.

In some aspects, the base station 702 may use the RIS information to use the RIS 706 for communication with a UE 704. For example, the base station 702 may transmit control signaling 716 to control the RIS's reflection of a signal to the UE 704 via the RIS surface of the RIS 706. The base station may then transmit a signal 718 to the UE on an impinging beam relative to the RIS 706, and the RIS 706 may reflect the signal, at 720) in a directional beam based on the control 716 provided by the base station 702.

In some aspects, the base station may provide the RIS information to other nodes within the cell by transmitting the RIS information, e.g., in information 722 about one or more RISs. A UE 704 may use the RIS information 722 to perform communication/sensing/positioning using the RIS information for the RIS 706 (e.g., including the position and/or RIS capabilities of the RIS 706).

Figure 8:
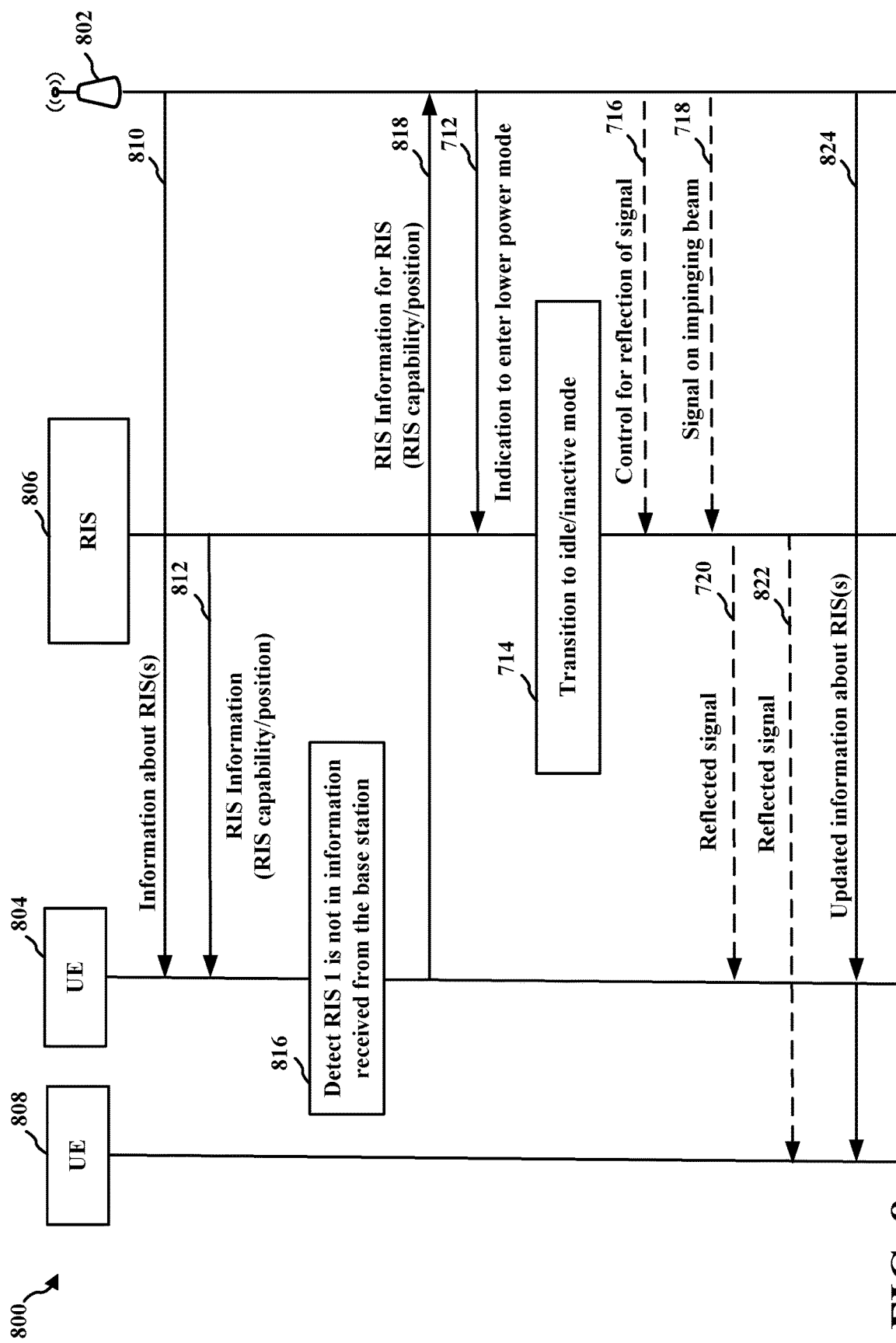
FIG. 8 illustrates an example communication flow including a base station indirectly acquiring RIS information about an RIS from a UE.

FIG. 8 illustrates an example communication flow 800 between a base station 802 and an RIS 806, and one or more UEs 804, 808 that enables acquisition of RIS information by the base station 802. Aspects that have already been described in connection with FIG. 7 use the same reference numbers as FIG. 7. The base station 802 may correspond to the base station 602 in FIG. 6B, which is outside the sidelink coverage 620 of the RIS 606, and the UEs 804, 808 may correspond to a UE 604 that is within the sidelink coverage 620 of the RIS 606. The base station 802 may similarly correspond to the base station 402 or 502, and the UEs 804, 808 may correspond to a UE 404a, 404b or 504 in FIG. 4B or FIG. 5.

In FIG. 8, the UE 804 may receive RIS information 810 from the base station 802 that includes RIS information for one or more RISs that are known by the base station 802. The RIS information 810 may indicate the position and/or RIS capabilities of each of the known RISs. The base station 802 may transmit the information 810 in system information. The RIS 806 transmits RIS information 812 in a sidelink message including at least position information for the RIS 806. The RIS 806 may transmit the RIS information in a unicast sidelink message to the UE 804. Alternatively, the RIS may broadcast the RIS information, such as in PSSCH, PSCCH, and/or PSDCH. The RIS information 812 may include information, as described in connection with 710 in FIG. 7.

As illustrated at 816, the UE may determine that the base station 802 does not know the RIS information received at 812. For example, the UE 804 may determine that the RIS information 812 is not included in the information 810 received from the base station 802 and/or has changed from the information 810 received from the base station. In response to the determination, at 816, the UE transmits the RIS information for the RIS 806 to the base station, at 818. Once the base station 802 receives the RIS information, the base station may indicate for the RIS 806 to transition to a reduced power mode, such as described in connection with FIG. 7. The base station may proceed to use the RIS information to communicate with the UE 804 and/or the UE 808 via the RIS 806. In contrast to FIG. 7, in FIG. 8, the base station 802 may receive the RIS information 818 from one UE 804 and may use the RIS information to transmit a reflected signal 822 to a different UE 808.

Additionally, or alternatively, the base station 802 may transmit updated information 824 about one or more RISs, including the information received at 818 for the RIS 806, which may be received by any UE within the coverage of the base station. The UEs receiving the RIS information may use the information to perform communication/sensing/positioning using the RIS 806, as described in connection with 724 in FIG. 7.

In some aspects, the RIS may not know its own position. For example the RIS may have a time varying position. The RIS may have sidelink transmission capability, such as via the sidelink communication component 527 comprised in the controller 525 of the RIS 506 in FIG. 5.

Figure 9:
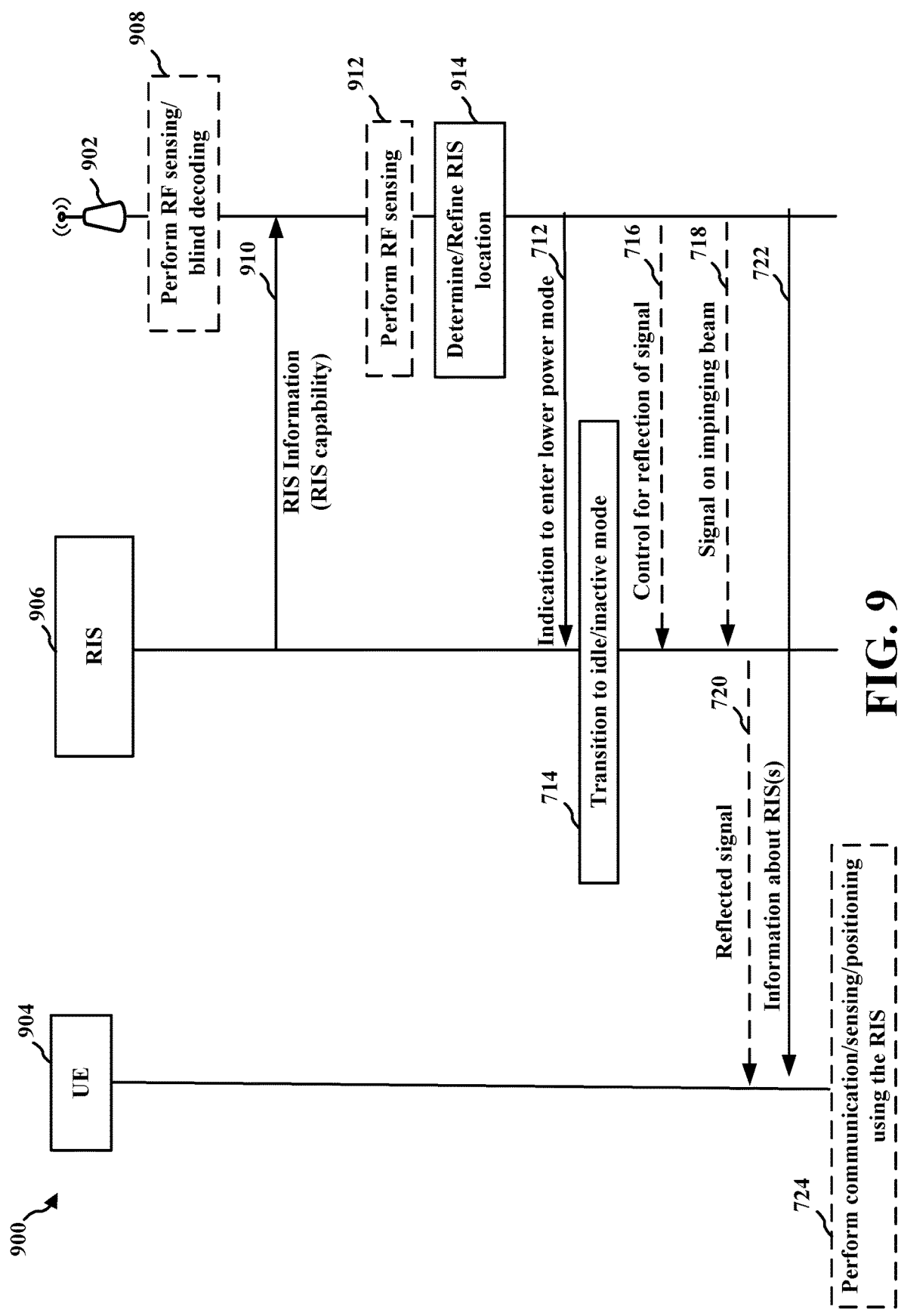
FIG. 9 illustrates an example communication flow including a base station directly acquiring RIS information about an RIS over sidelink.

FIG. 9 illustrates an example communication flow 900 between a base station 902 and an RIS 906 that enables acquisition of RIS information by the base station 902 directly from the RIS, such as described in connection with FIG. 7. Aspects that are the same as in FIG. 7 are illustrated with the same reference number. The base station 902 may correspond to the base station 602 in FIG. 6A, which is within the sidelink coverage 620 of the RIS 606. The base station 902 may similarly correspond to the base station 402 or 502 in FIG. 4B or FIG. 5. In FIG. 9, the RIS 906 transmits RIS information 910 that is received by the base station 902. The RIS information 910 may include information about RIS capabilities of the RIS 906, e.g., without including position information for the RIS 706. The RIS 906 may transmit the RIS information 910 as a sidelink unicast, e.g., directly to the base station 902. In other aspects, the RIS 906 may broadcast the RIS information. The RIS 906 may transmit the RIS information 910 on a PSCCH, a PSSCH, and/or a physical sidelink discovery channel (PSDCH).

The RIS 906 may transmit a self-identification token (such as a message indicating 'I am here' and/or other RIS information related to RIS capabilities) to nearby nodes (e.g. nodes within the sidelink coverage 620 of the RIS 606).

As illustrated at 908, the base station 902 may blindly perform RF sensing (searching for receiving the sidelink information) to detect the RIS position and/or to obtain other RIS information about the RIS 906. The RIS 906 may provide some limited RIS information, without exact position information. The limited information may be used by the base station 902 and/or shared with other nodes such as UE 904 and may be used to improve sensing (e.g., which beam could be a good impinging direction for the RIS).

The base station may employ monostatic sensing and/or bistatic sensing. In some aspects, monostatic sensing and/or bistatic sensing, at 912, may be triggered by receiving the RIS information at 910. The base station 902 may perform the sensing, at 912 via sidelink to refine the accuracy of a determination of the position of the RIS 906, as illustrated at 914. For bistatic sensing, the base station 902 may process a difference between the measurement of a direct sidelink signal and a reflected sensing signal from the RIS 906, which may improve the position accuracy that the base station determines for the RIS 906. After acquiring the RIS information 910 and/or determining/refining a position of the RIS at 914, the base station 902 and UE 904 may perform the aspects described in connection with any of 712-724 in FIG. 7.

Figure 10:
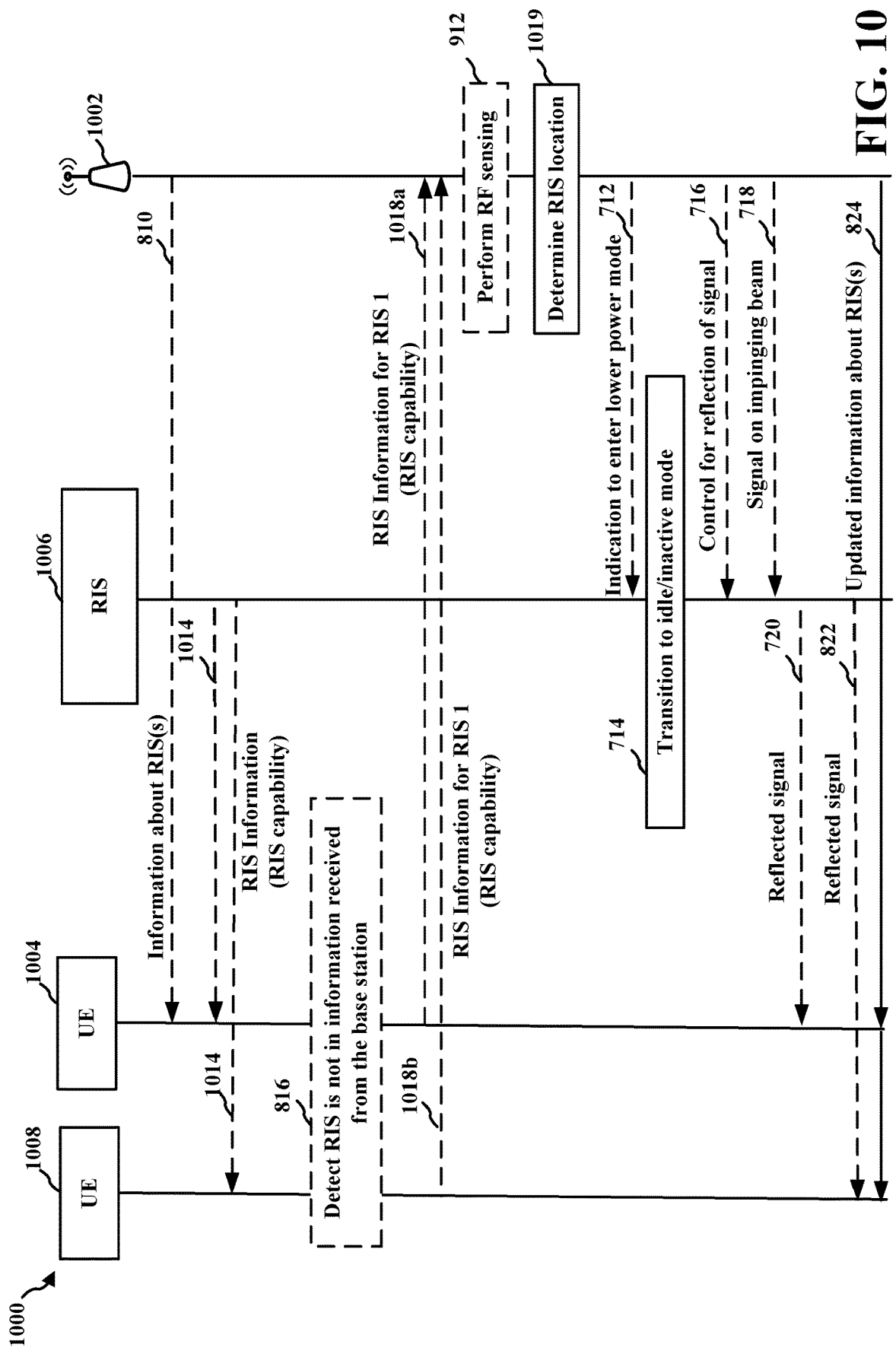
FIG. 10 illustrates an example communication flow including a base station indirectly acquiring RIS information about an RIS from a UE.

FIG. 10 illustrates an example communication flow 1000 between a base station 1002 and an RIS 1006, and one or more UEs 1004, 1008 that enables acquisition of RIS information by the base station 1002, similar to the aspects described in connection with FIG. 8. In contrast to FIG. 8, the RIS 906 may not know or may not provide position information, such as described in connection with FIG. 9. Aspects that have already been described in connection with FIGS. 7, 8, and/or 9 use the same reference numbers as FIGS. 7-9. The base station 1002 may correspond to the base station 602 in FIG. 6B, which is outside the sidelink coverage 620 of the RIS 606, and the UEs 1004, 1008 may correspond to a UE 604 that is within the sidelink coverage 620 of the RIS 606. The base station 1002 may similarly correspond to the base station 402 or 502, and the UEs 1004, 1008 may correspond to a UE 404a, 404b or 504 in FIG. 4B or FIG. 5.

In FIG. 10, the UE 1004 may receive RIS information 810 from the base station 1002 that includes RIS information for one or more RISs that are known by the base station 1002. The information 810 may be received in system information and may also be received by the UE 1008.

The UE 1004 may also receive RIS information 1014 from the RIS 1006. The RIS information 1014 may include information about RIS capabilities of the RIS 1006, e.g., without including position information for the RIS 1006. The RIS 1006 may transmit the RIS information 1014 as a sidelink unicast, e.g., directly to the UE 1004. In other aspects, the RIS 1006 may broadcast the RIS information 1014, and it may be received by the UE 1004 and 1008. Although two lines are shown for 1014, the transmissions may comprise a single transmission, if the RIS 906 broadcasts the RIS information 1014. The RIS 906 may transmit the RIS information 910 on a PSCCH, a PSSCH, and/or a physical sidelink discovery channel (PSDCH).

The RIS 1006 may transmit a self-identification token (such as a message indicating 'I am here' and/or other RIS information related to RIS capabilities) to nearby nodes (e.g. nodes within the sidelink coverage 620 of the RIS 606).

One or more of the UEs 1004 or 1008 may detect that the base station 1002 does not know the RIS information 1014 received from the RIS 1006, at 816, as described in connection with FIG. 8, and may respond by transmitting the RIS information 1018a or 1018b to the base station 1002. One of more of the UEs 1004 or 1008 may further provide their position information to the base station 1002. The base station 1002 may use the position received for the UE(s) 1004/1008 to determine the RIS position, at 1019 of the RIS 1006. The UEs in the cell may also perform RF sensing for the position of the RIS 1006 and deliver the position information to the base station 1002, e.g., with the information 1018a or 1018b or separately. The RF sensing may include aspects described in connection with 910 or 912 in FIG. 9. The UE(s) may report the RIS information as well as its own position and/or a beam direction to the base station 1002 as a reference for rough positioning of the RIS 1006. The base station may combine reports from multiple UEs (e.g., UE 1004 and UE 1008), as well as its own sensing measurement (obtained at 912), to determine and/or refine the RIS position, at 1019. The base station, RIS, and UEs may perform the additional aspects described in connection with FIGS. 7 and 8, including any of 712-720, 822, and 824.

The RIS may perform the aspects of FIGS. 9 and 10, if the RIS has sidelink transmission capability, for example.

In some aspects, the RIS may have both sidelink reception and sidelink transmission capabilities. In such aspects, the RIS may alternatively provide its RIS information to the control node in response to a discovery request. The request may be from a base station and/or a UE. FIG. 11A illustrates an example communication flow 1100 between an RIS 1106 and a UE 1104 and/or a base station 1102. The UE 1104 and/or the base station 1102 may transmit an RIS discovery request 1111 or 1110. The request may request discovery of nearby RIS 1106 (e.g., indicating 'who is there? are you there?') via unicast/broadcast sidelink channels, such as any of PSCCH, PSSCH, or PSDCH.

The request 1111 or 1110 can be sent in a periodic/aperiodic/on demand manner, depending on the purpose of RIS discovery and/or the RIS deployment scenario. For example, the UE 1104 or the base station 1102 may transmit a periodic request if surrounded by mobile RISs in order to have updated information about the nearby RISs. FIG. 11A illustrates the UE 1104 and the base station 1102 each transmitting multiple RIS discovery requests, such as in a periodic manner. In some aspects, the UE may transmit the RIS discovery request 1111 in response to receiving a request from the base station 1102. In some aspects, the RIS 1106 may be in an inactive or idle mode. The base station 1102 may transmit a wake up indication 1112 to the RIS 1106 prior to transmitting the RIS discover request 1110. The RIS 1106 may respond by waking up, at 1122, and listening to a sidelink channel in order to receive the RIS discover request 1111 and/or 1110. In response to receiving the RIS discover request 1111 and/or 1110, the RIS 1106 may transmit the RIS information 1114 to the UE 1104 and/or the base station 1102, as described in connection with any of FIGS. 6A-10. The UE, the base station, and the RIS may further perform any of the aspects described in connection with FIGS. 7-10.

The RIS may listen to sidelink channels and response to the request 1110 or 1111. The response may include the RIS's own position (if available) and other RIS information related to RIS capabilities.

FIG. 11B illustrates an example communication flow 1150 between an RIS 1106 and a UE 1104 and/or a base station 1102, in which the RIS 1106 may initiate the transmission of the RIS information by transmitting a self-identification message 1116 to the UE 1104 and/or the base station 1102. The RIS may transmit the message periodically, either as a unicast and/or a broadcast, such as described in connection with any of FIGS. 7-10. The RIS 1106 may continue to transmit the self-identification message (e.g., including a self-identification token indicating 'I am here') until the RIS 1106 receives a message 1118 from the base station 1102 indicating to change to a lower power mode, such as described in connection with 712.

Figure 12:
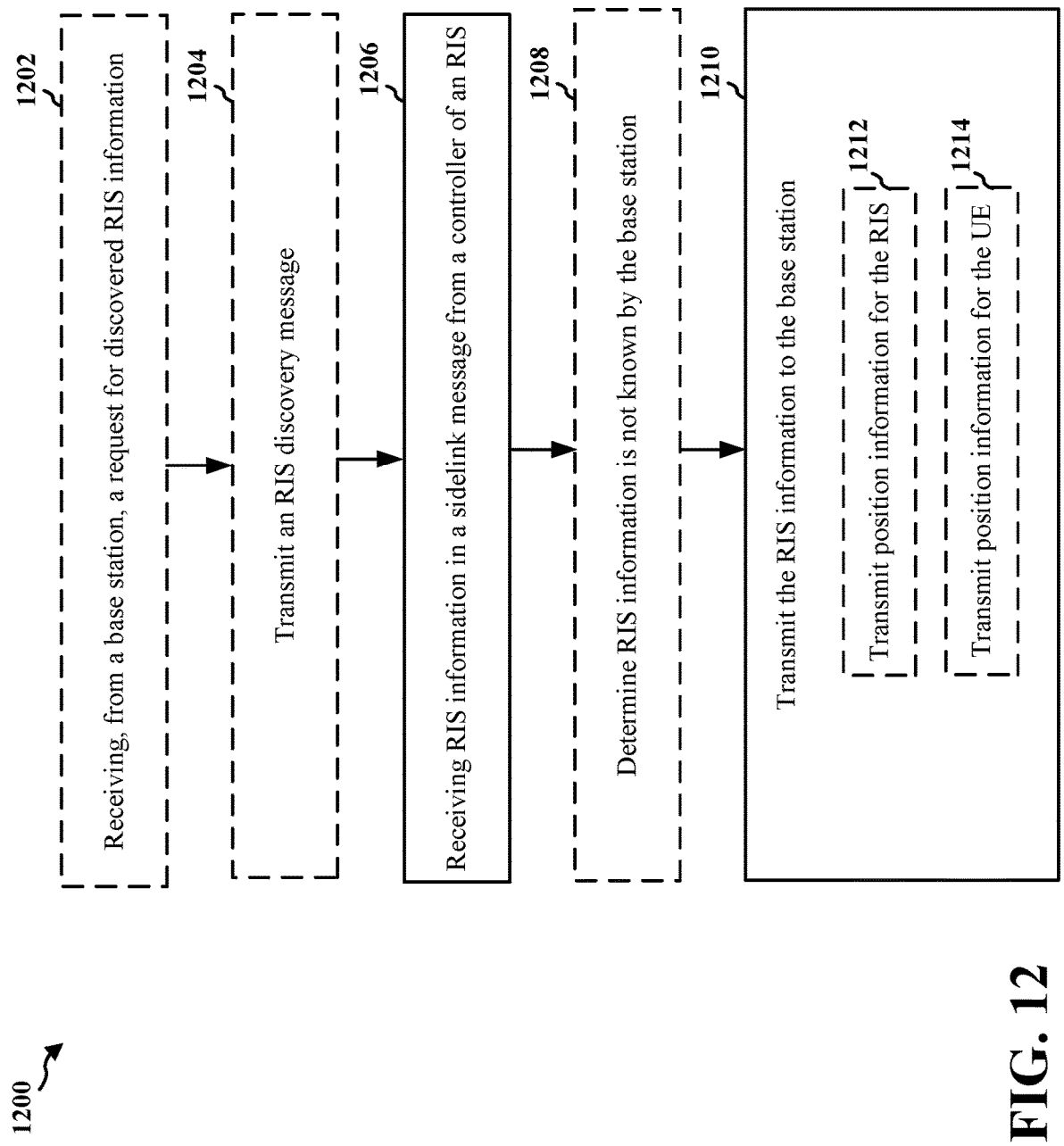
FIG. 12 is a flowchart of a method of wireless communication at a UE.

FIG. 12 is a flowchart 1200 of a method of wireless communication. The method may be performed by a UE (e.g., the UE 104, 404a, 404b, 504, 604, 704, 804, 808, 904, 104, 1008, 1104; the device 350; the apparatus 1302). Optional aspects are illustrated with a dashed line. The method may assist a control node in obtaining RIS information for an autonomously deployed RIS and/or a mobile RIS about which the control node does not have prior information.

At 1206, the UE receives RIS information in a sidelink message from a controller of an RIS. The reception may be performed, e.g., by the RIS information component 1340 via the reception component 1330 of the apparatus 1302 in FIG. 13. FIGS. 8 and 10 illustrate example aspects of a UE receiving the RIS information from a RIS. The RIS information may include position information for the RIS, e.g., as described in connection with FIG. 8. The UE may receive the RIS information from the RIS in one or more a PSSCH, a PSCCH, or a PSDCH. The UE may receive the RIS information in a unicast from the RIS to the UE. The UE may receive the RIS information in a broadcast from the RIS. The UE may receive a self-identification token from the RIS in a message comprising the RIS information, e.g., as described in connection with FIG. 11B.

AT 1210, the UE transmits the RIS information to a base station. The transmission may be performed, e.g., by the RIS information component 1340 via the transmission component 1334 of the apparatus 1302 in FIG. 13. The UE may transmit the RIS information to the base station in at least one of UCI, a MAC-CE, or an RRC message. As illustrated at 1214, the UE may transmit, to the base station, position information for the UE with the RIS information for the RIS. As illustrated at 1212, the UE may transmit position information for the RIS, as described in connection with FIGS. 8 and/or 10. The position information may be determined and/or transmitted by the position component 1348, e.g., via the transmission component 1334 of the apparatus 1302 in FIG. 13.

As illustrated at 1208, the UE may further determine that the RIS information is not known by the base station, e.g., as described in connection with 816 in FIG. 8. The UE transmits the RIS information to the base station in response to determining that the RIS information is not known by the base station. The determination may be performed by the determination component 1342 of the apparatus 1302 in FIG. 13.

As illustrated at 1202, the UE may receive, from the base station, a request for discovered RIS information in a cell provided by the base station, wherein the UE transmits the RIS information to the base station in response to the request. The reception of the request may be performed, e.g., by the BS discovery request component 1344 of the apparatus 1302 in FIG. 13. The UE may receive the request from the base station in at least one of system information, DCI, a MAC-CE, or an RRC message.

As illustrated at 1204, the UE may transmit an RIS discovery message, wherein the UE receives the RIS information in response to the RIS discovery message. The transmission of the RIS discovery message may be performed, e.g., by the RIS discovery request component 1346 of the apparatus 1302 in FIG. 13. The UE may transmit the RIS discovery message in one or more a PSSCH, a PSCCH, or a PSDCH. The UE may transmit the RIS discovery message periodically, such as described in connection with FIG. 11A. The RIS discovery message may be an aperiodic message. The UE may transmit the RIS discovery message in response to a request from the base station.

Figure 13:
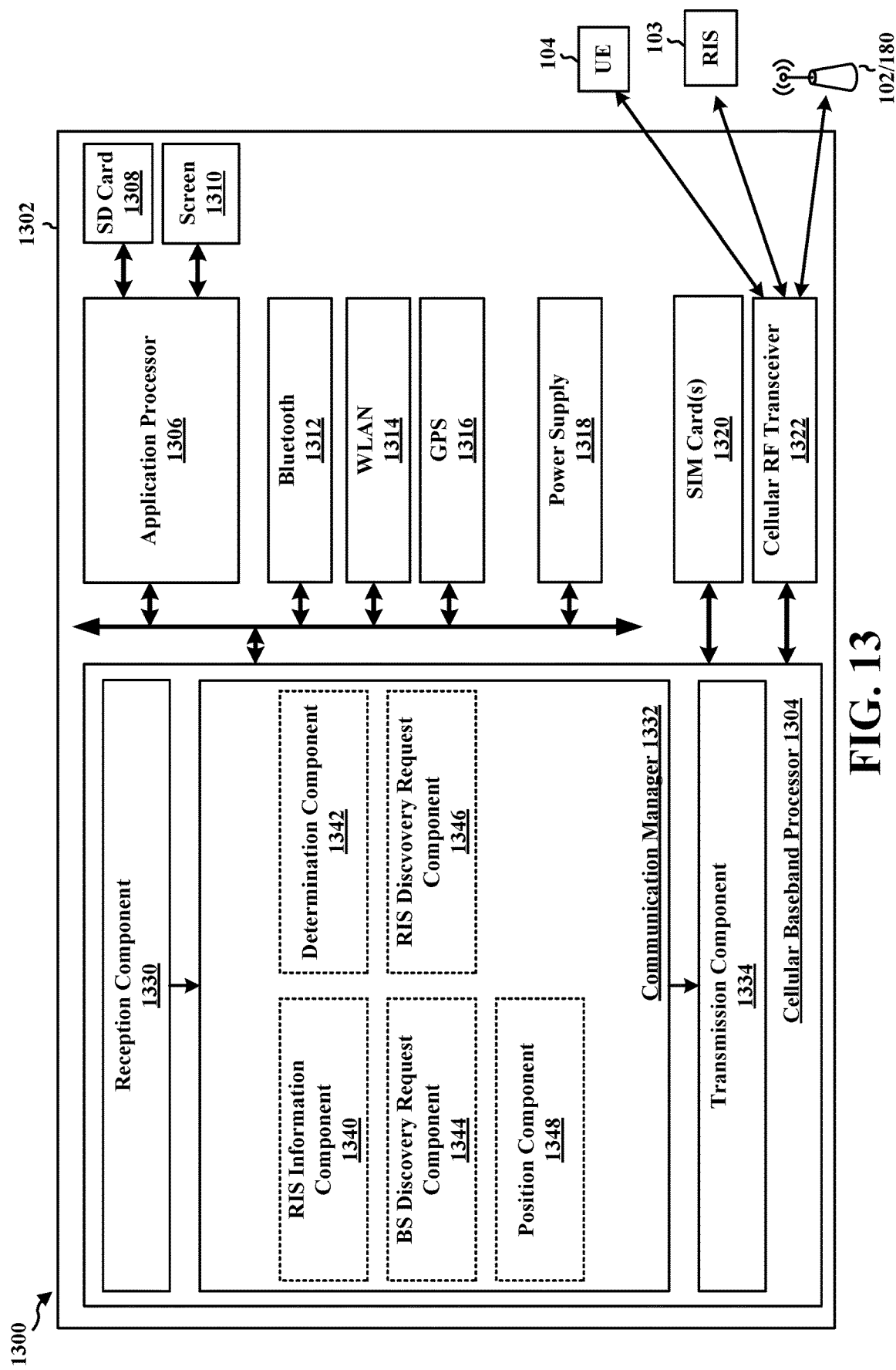
FIG. 13 is a diagram illustrating an example of a hardware implementation for an example apparatus that is configured to perform the method of FIG. 12.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104, RIS 103, and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the device 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire wireless device (e.g., see 350 of FIG. 3) and include the additional modules of the apparatus 1302.

The communication manager 1332 includes an RIS information component 1340, a determination component 1342, a BS discovery request component 1344, an RIS discovery request component 1346, and a position component 1348 configured to perform the aspects described in connection with FIG. 12.

The apparatus may include additional components that perform each of the blocks of the algorithm in the aforementioned flowchart of FIG. 12, and the aspects performed by the UE in any of FIGS. 7-11B. As such, each block in the aforementioned flowchart of FIG. 12, and the aspects performed by the UE in any of FIGS. 7-11B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for receiving reconfigurable intelligent surface (RIS) information in a sidelink message from a controller of an RIS; and means for transmitting the RIS information to a base station. The apparatus may further include means for determining that the RIS information is not known by the base station, means for receiving, from the base station, a request for discovered RIS information in a cell provided by the base station, means for transmitting, to the base station, position information for the UE with the RIS information for the RIS, and/or means for transmitting an RIS discovery message, wherein the UE receives the RIS information in response to the RIS discovery message. The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
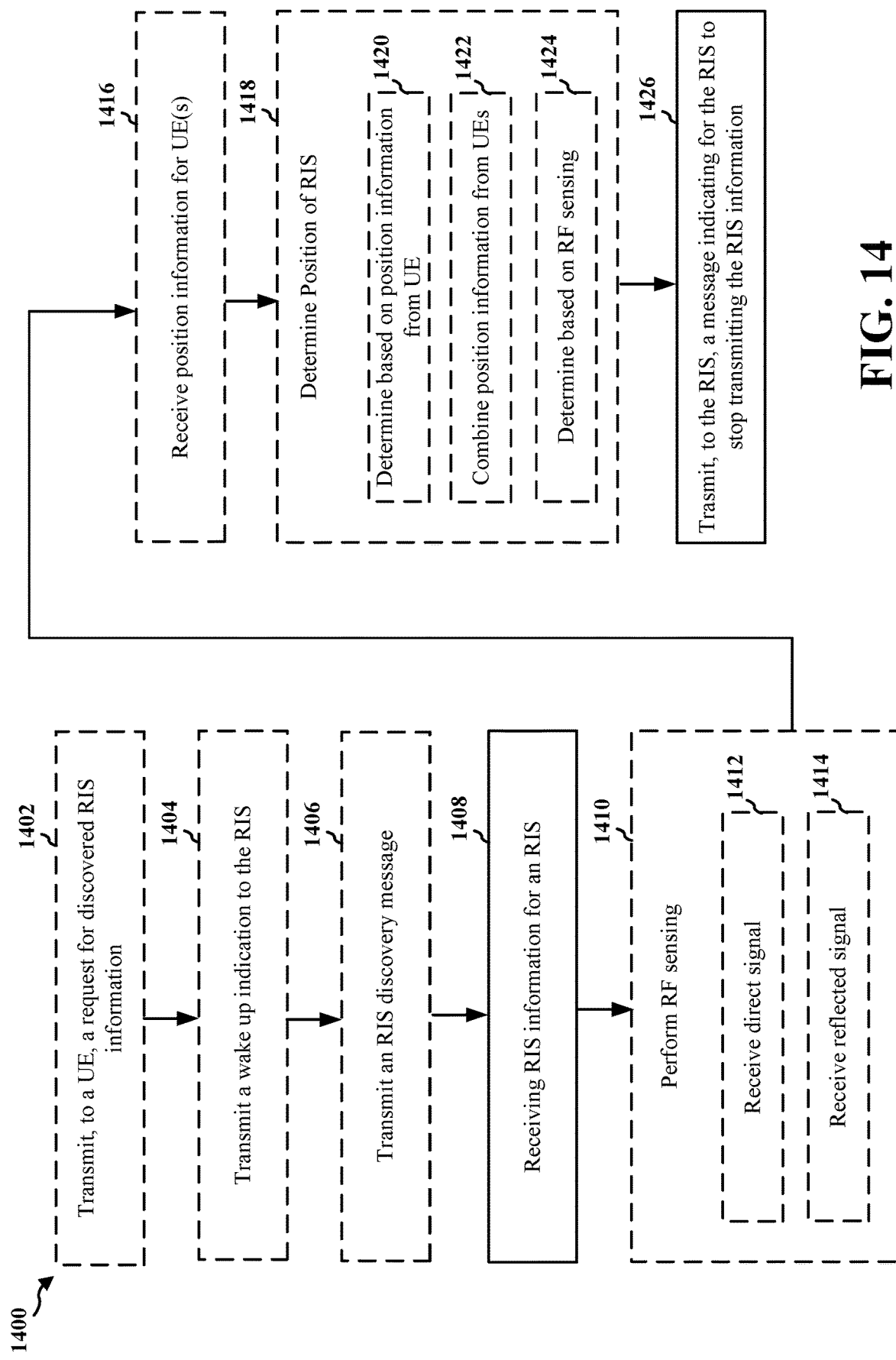
FIG. 14 is a flowchart of a method of wireless communication at a base station.

FIG. 14 is a flowchart 1400 of a method of wireless communication. The method may be performed by a base station (e.g., the base station 102/180, 402, 502, 602, 702, 802, 902, 1002, 1102, the device 310; the apparatus 1502. Optional aspects are illustrated with a dashed line. The method may enable a control node to obtain RIS information, and share RIS information, for an autonomously deployed RIS and/or a mobile RIS about which the control node does not have prior information.

At 1408, the base station receives RIS information for an RIS. The reception may be performed, e.g., by the RIS information component 1540 via the reception component 1530 of the apparatus 1502 in FIG. 15. The reception may include any of the aspects described in connection with the base station 702 in FIG. 7, the base station 802 in FIG. 8, the base station 902 in FIG. 9, the base station 1002 in FIG. 10, and/or the base station 1102 in FIGS. 11A and 11B. The RIS information may include position information for the RIS. The base station may receive the RIS information from a controller of the RIS, as described in connection with FIGS. 7 and/or 9. The base station may receive the RIS information from the RIS in one or more a PSCCH, a PSSCH, or a PSDCH. The base station may receive the RIS information in a unicast from the RIS to the base station. The base station may receive the RIS information in a broadcast from the RIS. The base station may receive the RIS information from a UE, e.g., as described in connection with FIGS. 8 and/or 10. The base station may receive the RIS information from the UE in at least one of UCI, a MAC-CE, or an RRC message.

At 1426 the base station transmits, to the RIS, a message indicating for the RIS to stop transmitting the RIS information. The transmission may be performed, e.g., by the indication component 1542 via the transmission component 1534 of the apparatus 1502 in FIG. 15. FIGS. 7-11 illustrate an example of indications, such as at 712 and 1118.

As illustrated at 1402, the base station may transmit, to the UE, a request for discovered RIS information in a cell provided by the base station. The base station may receive the RIS information from the UE in response to the request. The transmission may be performed, e.g., by the UE discovery request component 1544 via the transmission component 1534 of the apparatus 1502 in FIG. 15. The base station may transmit the request in at least one of system information, DCI, a MAC-CE, or an RRC message.

As illustrated at 1418, the base station may determine a position of the RIS, such as described in connection with FIG. 9 and/or FIG. 10. The determination may be performed, e.g., by the position determination component 1548 of the apparatus 1502 in FIG. 15. As illustrated at 1416, the base station may receive, from the UE, position information from the UE with the RIS information for the RIS. At 1420, the base station may determine a position of the RIS based at least in part on the position information from the UE. As illustrated at 1422, the base station may combine the position information from the UE with reports from at least one additional UE to determine the position of the RIS. As illustrated at 1410, the base station may perform RF sensing for a sidelink transmission from the RIS, wherein the base station determines the position of the RIS further based on the RF sensing. The RF sensing may be performed, e.g., by the RE sensing component 1552 of the apparatus 1502 in FIG. 15.

As an example, at 1410, the base station may perform RF sensing for a sidelink transmission from the RIS, and at 1424, the base station may determine a position of the RIS based on the RF sensing. The RF sensing, at 1410 may include receiving a direct message from a transmitting device, at 1412. The RF sensing may further include receiving a reflected message from the RIS, at 1414, the reflected message being a reflection of the direct message from the transmitting device, wherein the base station determines the position of the RIS based on the direct message and the reflected message.

As illustrated at 1406, the base station may transmit an RIS discovery message. FIG. 11A illustrates an example of a base station transmitting an RIS discovery request. The base station may receive the RIS information from a controller of the RIS in response to the RIS discovery message. The transmission may be performed, e.g., by the RIS discovery request component 1546 via the transmission component 1534 of the apparatus 1502 in FIG. 15. The base station may transmit the RIS discovery message in one or more a PSCCH, a PSSCH, or a PSDCH. The base station may transmit the RIS discovery message periodically. The RIS discovery message may be an aperiodic message.

As illustrated at 1404, the base station may transmit a wake up indication to the RIS prior to transmitting the RIS discovery message. The transmission may be performed, e.g., by the wake up component 1550 via the transmission component 1534 of the apparatus 1502 in FIG. 15. FIG. 11A illustrates an example of a base station 1102 transmitting an indication 1112 to the RIS 1106 to wake up the RIS in order to receive the RIS discovery request 1110 from the base station 1102.

Figure 15:
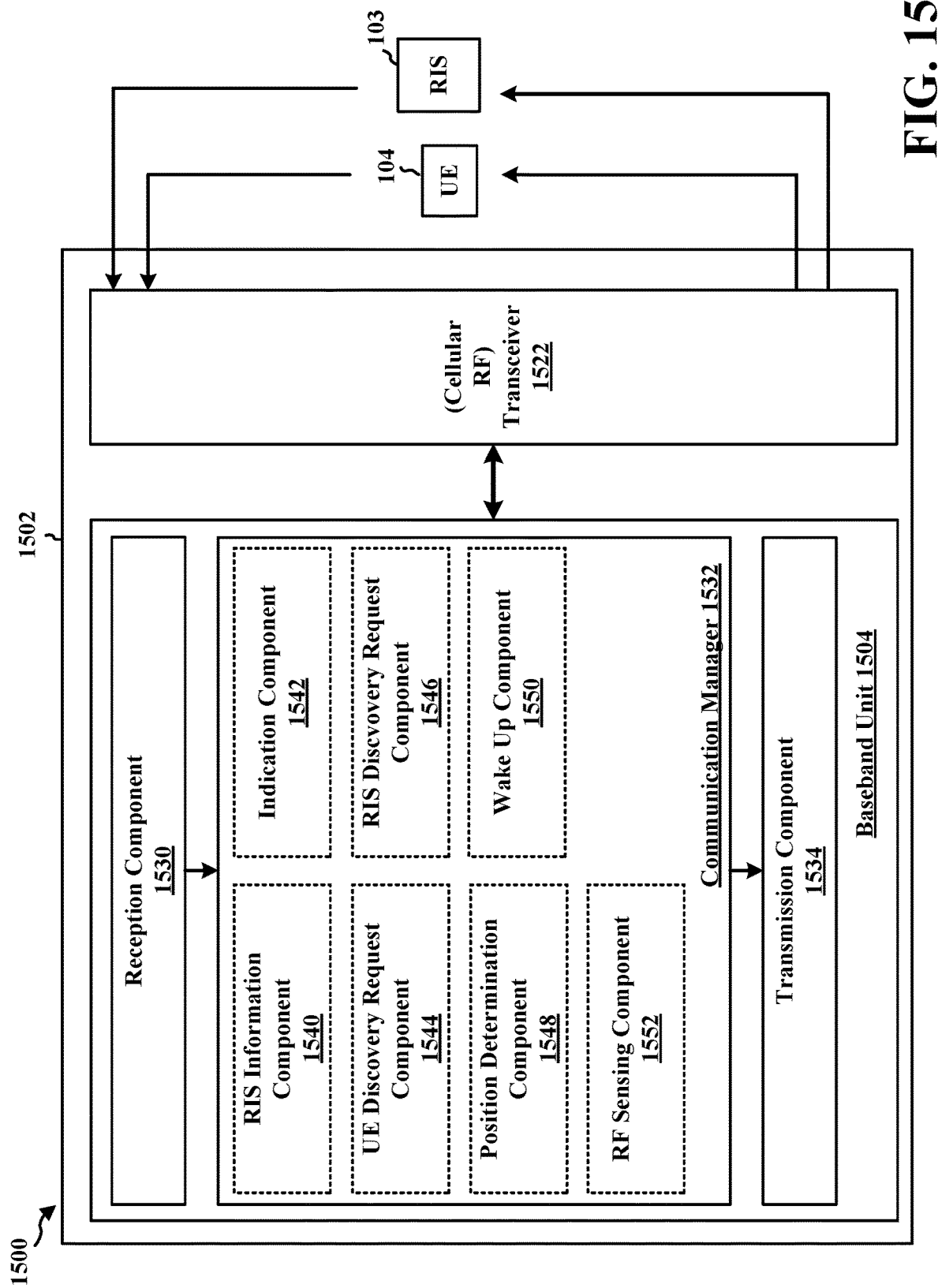
FIG. 15 is a diagram illustrating an example of a hardware implementation for an example apparatus that is configured to perform the method of FIG. 14.

FIG. 15 is a diagram 1500 illustrating an example of a hardware implementation for an apparatus 1502. The apparatus 1502 may be a base station and includes a baseband unit 1504. The baseband unit 1504 may communicate through a cellular RF transceiver 1522 with the UE 104 and the RIS 103. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the device 310 and may include the memory 376 and/or at least one of the TX processor 316, the RX processor 370, and the controller/processor 375.

The communication manager 1532 includes an RIS component 1540, an indication component 1542, a UE discovery request component 1544, an RIS discovery request component 1546, a position determination component 1548, a wake up component 1550, and/or an RF sensing component 1552 configured to perform the aspects described in connection with FIG. 14.

The apparatus may include additional components that perform each of the blocks of the algorithm in the aforementioned flowchart of FIG. 14 and/or the aspects performed by the base station in any of FIGS. 7-11B. As such, each block in the aforementioned flowchart of FIG. 14 and/or the aspects performed by the base station in any of FIGS. 7-11B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for receiving RIS information for an RIS and means for transmitting, to the RIS, a message indicating for the RIS to stop transmitting the RIS information. The apparatus may further include means for transmitting, to the UE, a request for discovered RIS information in a cell provided by the base station, means for receiving, from the UE, position information from the UE with the RIS information for the RIS, means for determining a position of the RIS based at least in part on the position information from the UE, means for combining the position information from the UE with reports from at least one additional UE to determine the position of the RIS, means for performing RF sensing for a sidelink transmission from the RIS, wherein the base station determines the position of the RIS further based on the RF sensing, means for performing RF sensing for a sidelink transmission from the RIS, means for determining a position of the RIS based on the RF sensing, means for receiving a direct message from a transmitting device, means for receiving a reflected message from the RIS, the reflected message being a reflection of the direct message from the transmitting device, means for transmitting an RIS discovery message, and means for transmitting a wake up indication to the RIS prior to transmitting the RIS discovery message. The aforementioned means may be one or more of the aforementioned components of the apparatus 1502 configured to perform the functions recited by the aforementioned means. As described supra, the apparatus 1502 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 16:
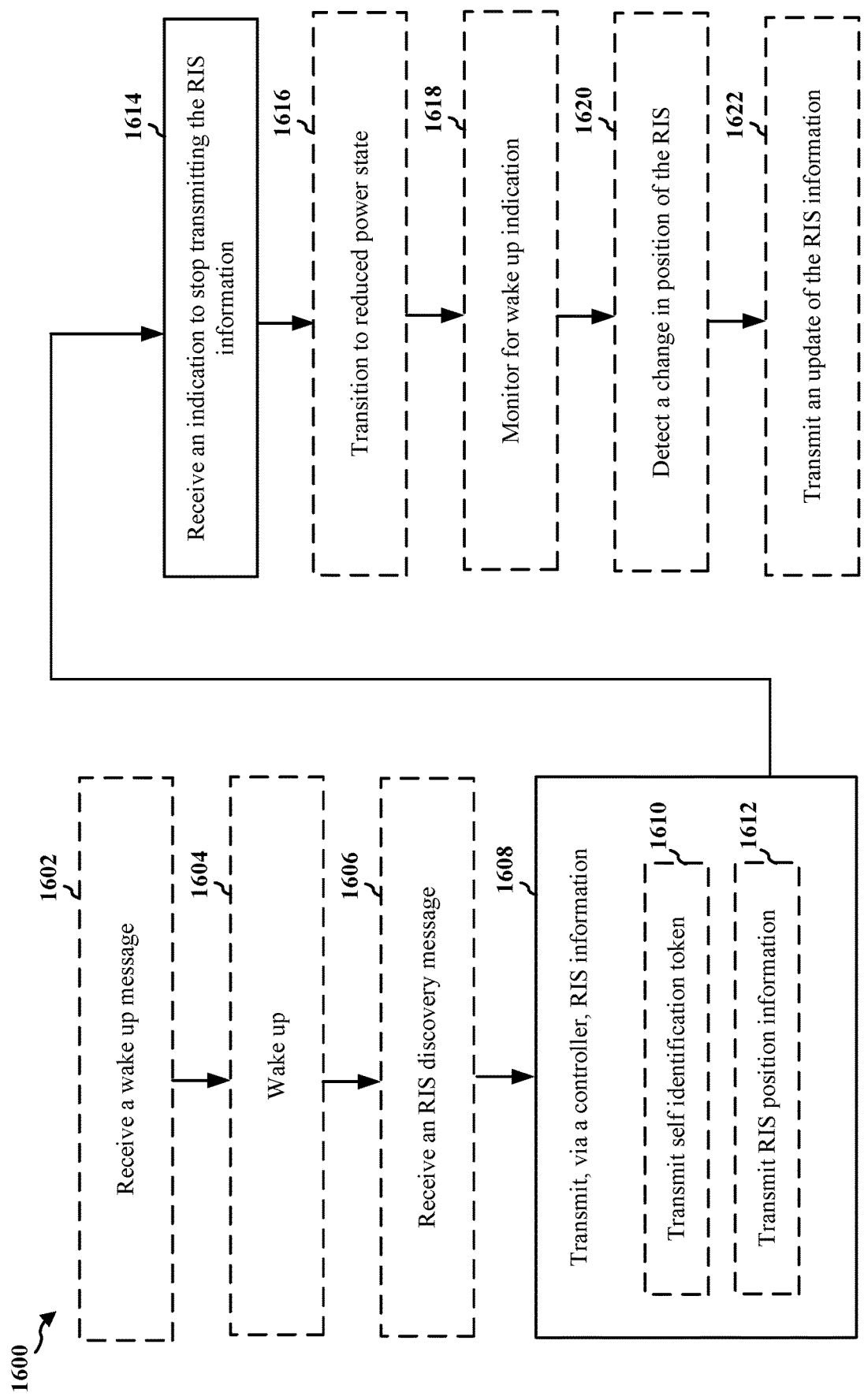
FIG. 16 is a flowchart of a method of wireless communication at an RIS.

FIG. 16 is a flowchart 1600 of a method of wireless communication. The method may be performed by an RIS (e.g., the RIS 103, 406, 506, 606, 706, 806, 906, 1006, 1106; the apparatus 1702. Optional aspects are illustrated with a dashed line. The method may assist a control node in obtaining RIS information for an autonomously deployed RIS and/or a mobile RIS about which the control node does not have prior information.

At 1608, the RIS transmits, via a controller at the RIS, a sidelink message comprising RIS information for the RIS. The transmission may be performed, e.g., by the RIS information component 1740 via the transmission component 1734 of the controller processing unit 1704 in FIG. 17. The RIS information may include position information for the RIS, e.g., as described in connection with FIG. 7 and/or FIG. 8. Thus, at 1612, the RIS may transmit RIS position information. In some aspects, the RIS information may indicate RIS capability or presence without indicating position information, such as described in connection with FIG. 9 and/or FIG. 10.

The RIS may transmit the RIS information in one or more a PSCCH, a PSSCH, or a PSDCH. The RIS may transmit the RIS information in a unicast. The RIS may broadcast the RIS information. As illustrated at 1610, the RIS may transmit a self-identification token with the RIS information. FIG. 11B illustrates an example of an RIS 1106 transmitting a self-identification token with RIS information. The RIS information may indicate one or more RIS capability supported by the RIS.

At 1614, the RIS receives, from a base station, an indication to stop transmitting the RIS information. The reception may be performed, e.g., by the indication component 1742 of the controller processing unit 1704 in FIG. 17. The indication may correspond to the indication 712 and/or the message 1118, as described in connection with any of FIGS. 7-11B.

At 1616, the RIS transitions to a reduced power state in response to receiving the indication from the base station. The transition may be performed, e.g., by the reduced power component 1748 of the controller processing unit 1704 in FIG. 17. FIGS. 7-10 illustrate examples of the RIS transitioning to a reduced power state (e.g., an idle state or an inactive state), at 714.

At 1618, the RIS monitors for a wake-up indication from the base station. The RIS may monitor for sidelink communication including a wake-up indication. FIG. 11A illustrates an example of a base station providing a wake-up indication to an RIS before transmitting an RIS discovery request. The monitoring may be performed, e.g., by the monitor component 1754 of the controller processing unit 1704 in FIG. 17.

At 1620, the RIS detects a change in position of the RIS, at in response, at 1622, the RIS transmits, via the controller of the RIS, an update of the RIS information. FIG. 7 illustrates an example of an RIS 706 detecting a change, at 726, which triggers a transmission of updated RIS information, at 728. The change may be detected, e.g., by the change detection component 1752 of the controller processing unit 1704 in FIG. 17. The transmission may be performed, e.g., by the RIS information component 1740 via the transmission component 1734 of the controller processing unit 1704 in FIG. 17.

As illustrated at 1606, the RIS may receive an RIS discovery message, wherein the RIS transmits the RIS information, at 1608, in response to reception of the RIS discovery message. The RIS may receive the RIS discovery message in one or more a PSCCH, a PSSCH, or a PSDCH. The RIS discovery message may be periodic. The RIS discovery message may be an aperiodic message. FIG. 11A illustrates an example of RIS discovery messages that may be received by the RIS. The reception of the RIS discovery message may be performed by the discovery request component 1746 of the controller processing unit 1704 in FIG. 17.

As illustrated at 1602, the RIS may receive a wake up message prior to receiving the RIS discovery message. FIG. 11A illustrates an example of a wake up indication being transmitted to the RIS in order for the RIS to receive a RIS discovery message. At 1604, the RIS may wake up to receive the RIS discovery message in response to the wake up message. The reception may be performed, e.g., by the reception component 1730 of the controller processing unit 1704 in FIG. 17. The wake up may be performed, e.g., by the wake up component 1750 of the controller processing unit 1704 in FIG. 17, in response to the wake up indication.

Figure 17:
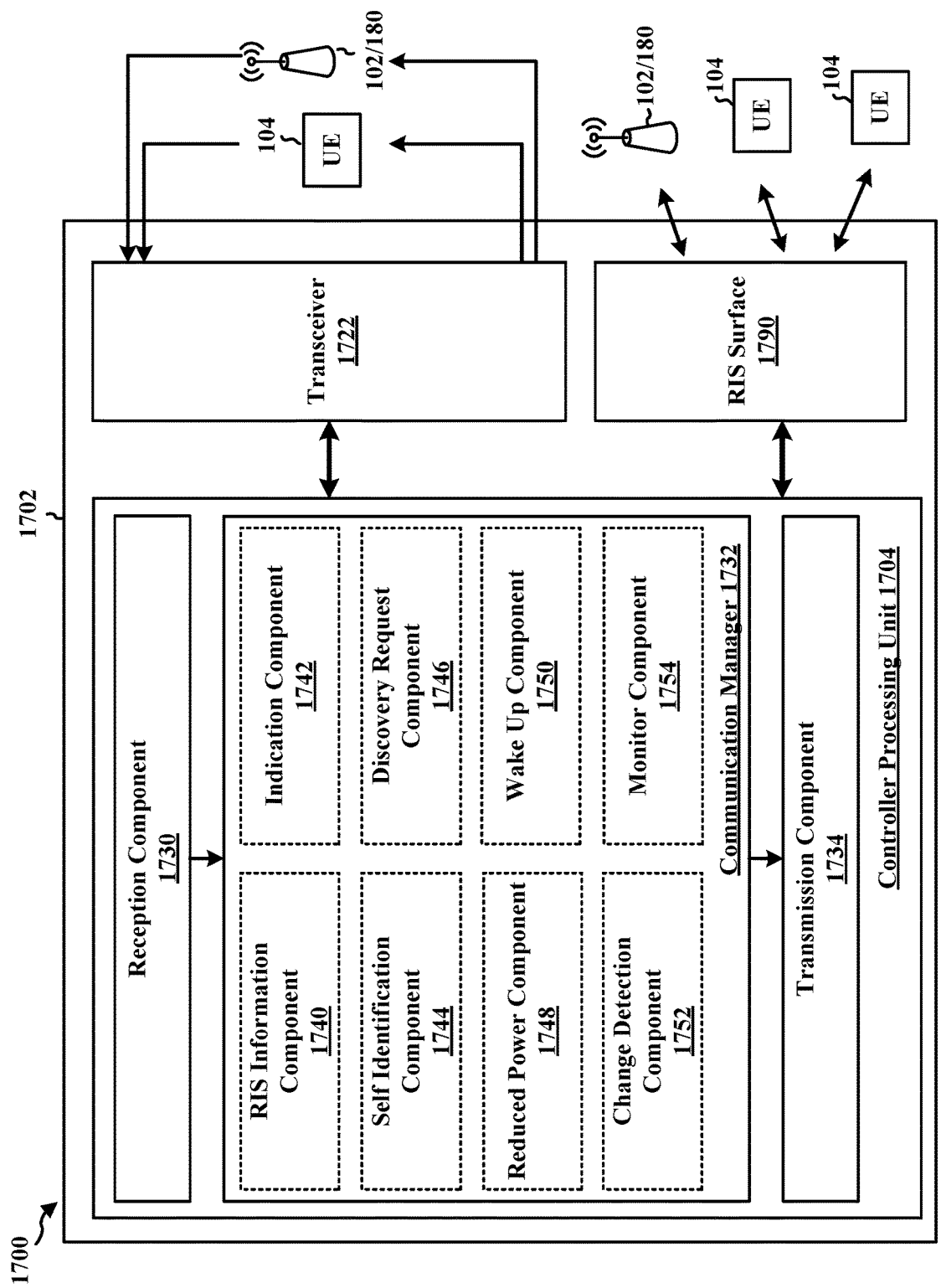
FIG. 17 is a diagram illustrating an example of a hardware implementation for an example apparatus that is configured to perform the method of FIG. 16.

FIG. 17 is a diagram 1700 illustrating an example of a hardware implementation for an apparatus 1702. The apparatus 1702 is an RIS and may include a controller processing unit 1704, e.g., as a part of a controller processor unit. The controller processing unit 1704 may communicate through a cellular RF transceiver 1722 via sidelink with the UE 104 and/or base station 102/180. The apparatus 1702 may further include an RIS surface 1790. The controller processing unit 1704 may include a computer-readable medium/memory. The controller processing unit 1704 is responsible for general processing, including the execution of software stored on the computer-readable medium/memory. The software, when executed by the controller processing unit 1704, causes the controller processing unit 1704 to perform the various functions described supra. The computer-readable medium/memory may also be used for storing data that is manipulated by the controller processing unit 1704 when executing software. The controller processing unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the controller processing unit 1704. The controller processing unit 1704 may be a component of the RIS 103 and may include the memory 376 and/or at least one of the TX processor 316, the RX processor 370, and the controller/processor 375, such as described in connection with the device 310.

The communication manager 1732 includes a component 1740 that RIS information component 1740, an indication component 1742, a self-identification component 1744, a discovery request component 1746, a reduced power component 1748, a wake up component 1750, a change detection component 1752, and a monitor component 1754 configured to perform the aspects described in connection with FIG. 16. In some aspects, the communication manager 1732 may support sidelink transmission and/or sidelink reception.

The apparatus may include additional components that perform each of the blocks of the algorithm in the aforementioned flowchart of FIG. 16 and the aspects performed by the RIS in any of FIGS. 7-11B. As such, each block in the aforementioned flowchart of FIG. 16 and the aspects performed by the RIS in any of FIGS. 7-11B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the controller processing unit 1704, includes means for transmitting, via a controller at the RIS, a sidelink message comprising RIS information for the RIS means for receiving, from a base station, an indication to stop transmitting the RIS information. The apparatus may further include means for transitioning to a reduced power state in response to receiving the indication from the base station, means for monitoring for a wake-up indication from the base station, means for detecting a change in position of the RIS, means for transmitting, via the controller of the RIS, an update of the RIS information, means for transmitting a self-identification token with the RIS information, means for receiving an RIS discovery message, where the RIS transmits the RIS information in response to reception of the RIS discovery message, means for receiving a wake up message prior to receiving the RIS discovery message, and/or means for waking up to receive the RIS discovery message in response to the wake up message. The aforementioned means may be one or more of the aforementioned components of the apparatus 1702 configured to perform the functions recited by the aforementioned means. As described supra, the apparatus 1702 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with aspects of other examples or teachings described herein, without limitation.

Aspect 1 is a method of wireless communication at a UE, comprising receiving RIS information in a sidelink message from a controller of an RIS; and transmitting the RIS information to a base station.

In aspect 2, the method of aspect 1 further includes that the RIS information includes position information for the RIS.

In aspect 3, the method of aspect 1 or aspect 2 further includes that the UE transmits the RIS information to the base station in at least one of UCI, a MAC-CE, or an RRC message.

In aspect 4, the method of any of aspects 1-3 further includes determining that the RIS information is not known by the base station, wherein the UE transmits the RIS information to the base station in response to determining that the RIS information is not known by the base station.

In aspect 5, the method of any of aspects 1-4 further includes receiving, from the base station, a request for discovered RIS information in a cell provided by the base station, wherein the UE transmits the RIS information to the base station in response to the request.

In aspect 6, the method of aspect 6 further includes that the UE receives the request from the base station in at least one of system information, DCI, a MAC-CE, or an RRC message.

In aspect 7, the method of any of aspects 1-6 further includes that the UE receives the RIS information from the RIS in one or more a PSCCH, a PSSCH, or a PSDCH.

In aspect 8, the method of any of aspects 1-7 further includes that the UE receives the RIS information in a unicast from the RIS to the UE.

In aspect 9, the method of any of aspects 1-7 further includes that the UE receives the RIS information in a broadcast from the RIS.

In aspect 10, the method of any of aspects 1-9 further includes transmitting, to the base station, position information for the UE with the RIS information for the RIS.

In aspect 11, the method of any of aspects 1-10 further includes that the UE receives a self-identification token from the RIS in a message comprising the RIS information.

In aspect 12, the method of any of aspects 1-10 further includes transmitting an RIS discovery message, wherein the UE receives the RIS information in response to the RIS discovery message.

In aspect 13, the method of aspect 12 further includes that the UE transmits the RIS discovery message in one or more a PSCCH, a PSSCH, or a PSDCH.

In aspect 14, the method of aspects 12 or 13 further includes that the UE transmits the RIS discovery message periodically.

In aspect 15, the method of aspects 12 or 13 further includes that the RIS discovery message is an aperiodic message.

In aspect 16, the method of aspects 12 or 13 further includes that the UE transmits the RIS discovery message in response to a request from the base station.

Aspect 17 is a device including one or more processors and one or more memories in electronic communication with the one or more processors storing instructions executable by the one or more processors to cause the device to implement a method as in any of aspects 1-16.

Aspect 18 is a system or apparatus including means for implementing a method or realizing an apparatus as in any of aspects 1-16.

Aspect 19 is an apparatus for wireless communication, comprising memory and at least one processor coupled to the memory, the memory and at least one processor being configured to perform the method of any of aspects 1-16.

Aspect 20 is a non-transitory computer-readable storage medium storing computer executable code, the code when executed by a processor causes the processor to perform the method of any of aspects 1-16.

Aspect 21 is a method of wireless communication at a base station, comprising: receiving RIS information for an RIS; and transmitting, to the RIS, a message indicating for the RIS to stop transmitting the RIS information.

In aspect 22, the method of aspect 21 further includes that the RIS information includes position information for the RIS.

In aspect 23, the method of aspect 21 or aspect 22 further includes that the base station receives the RIS information from a controller of the RIS.

In aspect 24, the method of aspect 23 further includes that the base station receives the RIS information from the RIS in one or more a PSCCH, a PSSCH, or a PSDCH.

In aspect 25, the method of aspect 23 or aspect 24 further includes that the base station receives the RIS information in a unicast from the RIS to the base station.

In aspect 26, the method of aspect 23 or aspect 24 further includes that the base station receives the RIS information in a broadcast from the RIS.

In aspect 27, the method of any of aspects 21-26 further includes that the base station receives the RIS information from a UE.

In aspect 28, the method of aspect 27 further includes that the base station receives the RIS information from the UE in at least one of UCI, a MAC-CE, or an RRC message.

In aspect 29, the method of any of aspects 21-28 further includes transmitting, to the UE, a request for discovered RIS information in a cell provided by the base station, wherein the base station receives the RIS information from the UE in response to the request.

In aspect 30, the method of aspect 29 further includes that the base station transmits the request in at least one of system information, DCI, a MAC-CE, or an RRC message.

In aspect 31, the method of any of aspects 21-30 further includes receiving, from the UE, position information from the UE with the RIS information for the RIS; and determining a position of the RIS based at least in part on the position information from the UE.

In aspect 32, the method of aspect 31 further includes combining the position information from the UE with reports from at least one additional UE to determine the position of the RIS.

In aspect 33, the method of aspect 31 or 32 further includes performing radio frequency (RF) sensing for a sidelink transmission from the RIS, wherein the base station determines the position of the RIS further based on the RF sensing.

In aspect 34, the method of any of aspects 21-33 further includes performing RF sensing for a sidelink transmission from the RIS; and determining a position of the RIS based on the RF sensing.

In aspect 35, the method of aspect 34 further includes that the RF sensing includes: receiving a direct message from a transmitting device; and receiving a reflected message from the RIS, the reflected message being a reflection of the direct message from the transmitting device, wherein the base station determines the position of the RIS based on the direct message and the reflected message.

In aspect 36, the method of any of aspects 21-35 further includes transmitting an RIS discovery message, wherein the base station receives the RIS information from a controller of the RIS in response to the RIS discovery message.

In aspect 37, the method of aspect 36 further includes that the base station transmits the RIS discovery message in one or more a PSCCH, a PSSCH, or a PSDCH.

In aspect 38, the method of aspect 36 or aspect 37 further includes that the base station transmits the RIS discovery message periodically.

In aspect 39, the method of aspect 36 or aspect 37 further includes that the RIS discovery message is an aperiodic message.

In aspect 40, the method of any of aspects 36-40 further includes that transmitting a wake up indication to the RIS prior to transmitting the RIS discovery message.

Aspect 41 is a device including one or more processors and one or more memories in electronic communication with the one or more processors storing instructions executable by the one or more processors to cause the device to implement a method as in any of aspects 21-40.

Aspect 42 is a system or apparatus including means for implementing a method or realizing an apparatus as in any of aspects 21-40.

Aspect 43 is an apparatus for wireless communication, comprising memory and at least one processor coupled to the memory, the memory and at least one processor being configured to perform the method of any of aspects 21-40.

Aspect 44 is a non-transitory computer-readable storage medium storing computer executable code, the code when executed by a processor causes the processor to perform the method of any of aspects 21-40.

Aspect 45 is a method of wireless communication at a reconfigurable intelligent surface (RIS), comprising: transmitting, via a controller at the RIS, a sidelink message comprising RIS information for the RIS; and receiving, from a base station, an indication to stop transmitting the RIS information.

In aspect 46, the method of aspect 45 further includes transitioning to a reduced power state in response to receiving the indication from the base station.

In aspect 47, the method of aspect 45 or aspect 46 further includes monitoring for a wake-up indication from the base station.

In aspect 48, the method of any of aspects 45-47 further includes detecting a change in position of the RIS; and transmitting, via the controller of the RIS, an update of the RIS information.

In aspect 49, the method of any of aspects 45-48 further includes that the RIS information includes position information for the RIS.

In aspect 50, the method of any of aspects 45-49 further includes that the RIS transmits the RIS information in one or more a PSCCH, a PSSCH, or a PSDCH.

In aspect 51, the method of any of aspects 45-50 further includes that the RIS transmits the RIS information in a unicast.

In aspect 52, the method of any of aspects 45-51 further includes that the RIS broadcasts the RIS information.

In aspect 53, the method of any of aspects 45-52 further includes transmitting a self-identification token with the RIS information.

In aspect 54, the method of any of aspects 45-53 further includes that the RIS information indicates one or more RIS capability supported by the RIS.

In aspect 55, the method of any of aspects 45-54 further includes receiving an RIS discovery message, wherein the RIS transmits the RIS information in response to reception of the RIS discovery message.

In aspect 56, the method of aspect 55 further includes that the RIS receives the RIS discovery message in one or more a PSCCH, a PSSCH, or a PSDCH.

In aspect 57, the method of aspect 55 or 56 further includes that the RIS discovery message is a periodic.

In aspect 58, the method of aspect 55 or 56 further includes that the RIS discovery message is an aperiodic message.

In aspect 59, the method of any of aspects 55-58 further includes receiving a wake up message prior to receiving the RIS discovery message; and waking up to receive the RIS discovery message in response to the wake up message.

Aspect 60 is a device including one or more processors and one or more memories in electronic communication with the one or more processors storing instructions executable by the one or more processors to cause the device to implement a method as in any of aspects 45-59.

Aspect 61 is a system or apparatus including means for implementing a method or realizing an apparatus as in any of aspects 45-59.

Aspect 62 is an apparatus for wireless communication, comprising memory and at least one processor coupled to the memory, the memory and at least one processor being configured to perform the method of any of aspects 45-59.

Aspect 63 is a non-transitory computer-readable storage medium storing computer executable code, the code when executed by a processor causes the processor to perform the method of any of aspects 45-59.

What is claimed is:

1. A method of wireless communication at a user equipment (UE), comprising:
   receiving, at the UE, reconfigurable intelligent surface (RIS) information in a sidelink message from a controller of an RIS; and
   transmitting, from the UE to a base station, the RIS information including RIS position information for the RIS or the RIS information with UE position information for the UE.

2. The method of claim 1, wherein the RIS information includes the RIS position information for the RIS.

3. The method of claim 1, wherein the UE transmits the RIS information to the base station in at least one of uplink control information (UCI), a medium access control-control element (MAC-CE), or a radio resource control (RRC) message.

4. The method of claim 1, further comprising:
   determining that the RIS information is not known by the base station, wherein the UE transmits the RIS information to the base station in response to determining that the RIS information is not known by the base station.

5. The method of claim 1, further comprising:
   receiving, from the base station, a request for discovered RIS information in a cell provided by the base station, wherein the UE transmits the RIS information to the base station in response to the request.

6. The method of claim 1, wherein transmitting the RIS information further comprises:
   transmitting, to the base station, the UE position information for the UE with the RIS information for the RIS.

7. The method of claim 1, wherein the UE receives a self-identification token from the RIS in a message comprising the RIS information.

8. The method of claim 1, further comprising:
   transmitting an RIS discovery message, wherein the UE receives the RIS information in response to the RIS discovery message.

9. The method of claim 8, wherein the UE transmits the RIS discovery message in response to a request from the base station.

10. A method of wireless communication at a base station, comprising:
    receiving, at the base station, reconfigurable intelligent surface (RIS) information for an RIS;
    determining a position of the RIS; and
    transmitting, from the base station to the RIS, a message indicating for the RIS to stop transmitting the RIS information based on reception of the RIS information and a determination of the position of the RIS.

11. The method of claim 10, wherein the RIS information includes position information for the RIS.

12. The method of claim 10, wherein the base station receives the RIS information from a controller of the RIS.

13. The method of claim 10, wherein the base station receives the RIS information from a UE.

14. The method of claim 13, further comprising:
    transmitting, to the UE, a request for discovered RIS information in a cell provided by the base station, wherein the base station receives the RIS information from the UE in response to the request.

15. The method of claim 13, further comprising:
    receiving, from the UE, position information from the UE with the RIS information for the RIS
    wherein the position of the RIS is based at least in part on the position information from the UE.

16. The method of claim 15, further comprising:
combining the position information from the UE with reports from at least one additional UE to determine the position of the RIS.

17. The method of claim 16, further comprising:
performing radio frequency (RF) sensing for a sidelink transmission from the RIS, wherein the base station determines the position of the RIS further based on the RF sensing.

18. The method of claim 16, further comprising:
performing radio frequency (RF) sensing for a sidelink transmission from the RIS; and
determining the position of the RIS based on the RF sensing.

19. The method of claim 18, wherein the RF sensing includes:
receiving a direct message from a transmitting device; and
receiving a reflected message from the RIS, the reflected message being a reflection of the direct message from the transmitting device, wherein the base station determines the position of the RIS based on the direct message and the reflected message.

20. The method of claim 10, further comprising:
transmitting an RIS discovery message, wherein the base station receives the RIS information from a controller of the RIS in response to the RIS discovery message.

21. The method of claim 20, further comprising:
transmitting a wake up indication to the RIS prior to transmitting the RIS discovery message.

22. A method of wireless communication at a reconfigurable intelligent surface (RIS), comprising:
transmitting, via a controller at the RIS, a sidelink message comprising RIS information for the RIS; and
receiving, from a base station, an indication to stop transmitting the RIS information.

23. The method of claim 22, further comprising:
transitioning to a reduced power state in response to receiving the indication from the base station.

24. The method of claim 22, further comprising:
monitoring for a wake-up indication from the base station.

25. The method of claim 22, further comprising:
detecting a change in position of the RIS; and
transmitting, via the controller of the RIS, an update of the RIS information.

26. The method of claim 22, wherein the RIS information includes position information for the RIS.

27. The method of claim 22, further comprising:
transmitting a self-identification token with the RIS information.

28. The method of claim 22, wherein the RIS information indicates one or more RIS capability supported by the RIS.

29. The method of claim 22, further comprising:
receiving an RIS discovery message, wherein the RIS transmits the RIS information in response to reception of the RIS discovery message.

30. The method of claim 29, further comprising:
receiving a wake up message prior to receiving the RIS discovery message; and
waking up to receive the RIS discovery message in response to the wake up message.

* * * * *